United States Patent
Son et al.

(10) Patent No.: US 10,854,956 B2
(45) Date of Patent: Dec. 1, 2020

(54) ELECTRONIC DEVICE INCLUDING ANTENNA

(71) Applicant: SAMSUNG ELECTRONICS CO., LTD., Suwon-si (KR)

(72) Inventors: Mu Chang Son, Suwon-si (KR); Sang Ho Hong, Suwon-si (KR); Seon Kyu Kim, Suwon-si (KR); Hyun Seung Yoon, Yongin-si (KR); Hyo Jung Lee, Suwon-si (KR); Sung Chul Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 16/314,965

(22) PCT Filed: Jul. 5, 2017

(86) PCT No.: PCT/KR2017/007159
§ 371 (c)(1),
(2) Date: Jan. 3, 2019

(87) PCT Pub. No.: WO2018/012794
PCT Pub. Date: Jan. 18, 2018

(65) Prior Publication Data
US 2019/0312336 A1    Oct. 10, 2019

(30) Foreign Application Priority Data
Jul. 11, 2016    (KR) .................... 10-2016-0087276

(51) Int. Cl.
*H01Q 1/24*        (2006.01)
*H01Q 5/371*       (2015.01)
(Continued)

(52) U.S. Cl.
CPC ............... *H01Q 1/243* (2013.01); *H01Q 1/24* (2013.01); *H01Q 5/335* (2015.01); *H01Q 5/364* (2015.01);
(Continued)

(58) Field of Classification Search
CPC ........ H01Q 1/243; H01Q 5/364; H01Q 5/335; H01Q 1/24; H01Q 5/371; H01Q 21/30; H04B 1/00; H04B 1/401
See application file for complete search history.

(56) References Cited

U.S. PATENT DOCUMENTS 6,876,840 B2    4/2005  Shin et al.
7,696,842 B2    4/2010  Uejima et al.
(Continued)

FOREIGN PATENT DOCUMENTS

KR    10-2005-0062168    6/2005
KR    10-2009-0023848    3/2009
(Continued)

OTHER PUBLICATIONS

Extended Search Report dated Jun. 3, 2019 in counterpart European Patent Application No. 17827868.5.
(Continued)

*Primary Examiner* — Daniel D Chang
(74) *Attorney, Agent, or Firm* — Nixon & Vanderhye P.C.

(57) ABSTRACT

Disclosed is an electronic device. The electronic device according to an embodiment includes an antenna element configured to receive a signal in at least one frequency band of a first frequency band and a second frequency band, a signal distributor electrically connected with the antenna element, and including a first filter corresponding to the first frequency band and a second filter corresponding to the second frequency band, a matching circuit electrically connectable with the second filter, a transceiver electrically
(Continued)

connected with the signal distributor, a switch connecting the second filter with the matching circuit or the transceiver, and a processor electrically connected with the transceiver. Moreover, various embodiments found through the present disclosure are possible.

15 Claims, 15 Drawing Sheets

(51) Int. Cl.
*H01Q 21/30* (2006.01)
*H04B 1/401* (2015.01)
*H01Q 5/364* (2015.01)
*H01Q 5/335* (2015.01)
*H04B 1/00* (2006.01)

(52) U.S. Cl.
CPC ............ *H01Q 5/371* (2015.01); *H01Q 21/30* (2013.01); *H04B 1/00* (2013.01); *H04B 1/401* (2013.01)

(56) References Cited

U.S. PATENT DOCUMENTS

| 9,136,991 | B2 | 9/2015 | Kim et al. | |
|---|---|---|---|---|
| 2003/0124984 | A1* | 7/2003 | Shin | H04B 1/406 455/78 |
| 2008/0191812 | A1* | 8/2008 | Uejima | H04B 1/006 333/101 |
| 2011/0163937 | A1* | 7/2011 | Jung | H01Q 5/378 343/893 |
| 2014/0177493 | A1* | 6/2014 | Kim | H03F 3/72 370/297 |
| 2016/0028157 | A1 | 1/2016 | Kim et al. | |
| 2016/0112113 | A1 | 4/2016 | Liou et al. | |

FOREIGN PATENT DOCUMENTS

| KR | 10-2014-0080309 | 6/2014 |
|---|---|---|
| WO | 2010/030128 | 3/2010 |

OTHER PUBLICATIONS

International Search Report for PCT/KR2017/007159 dated Oct. 18, 2017, 4 pages.
Written Opinion of the ISA for PCT/KR2017/007159 dated Oct. 18, 2017, 8 pages.

* cited by examiner

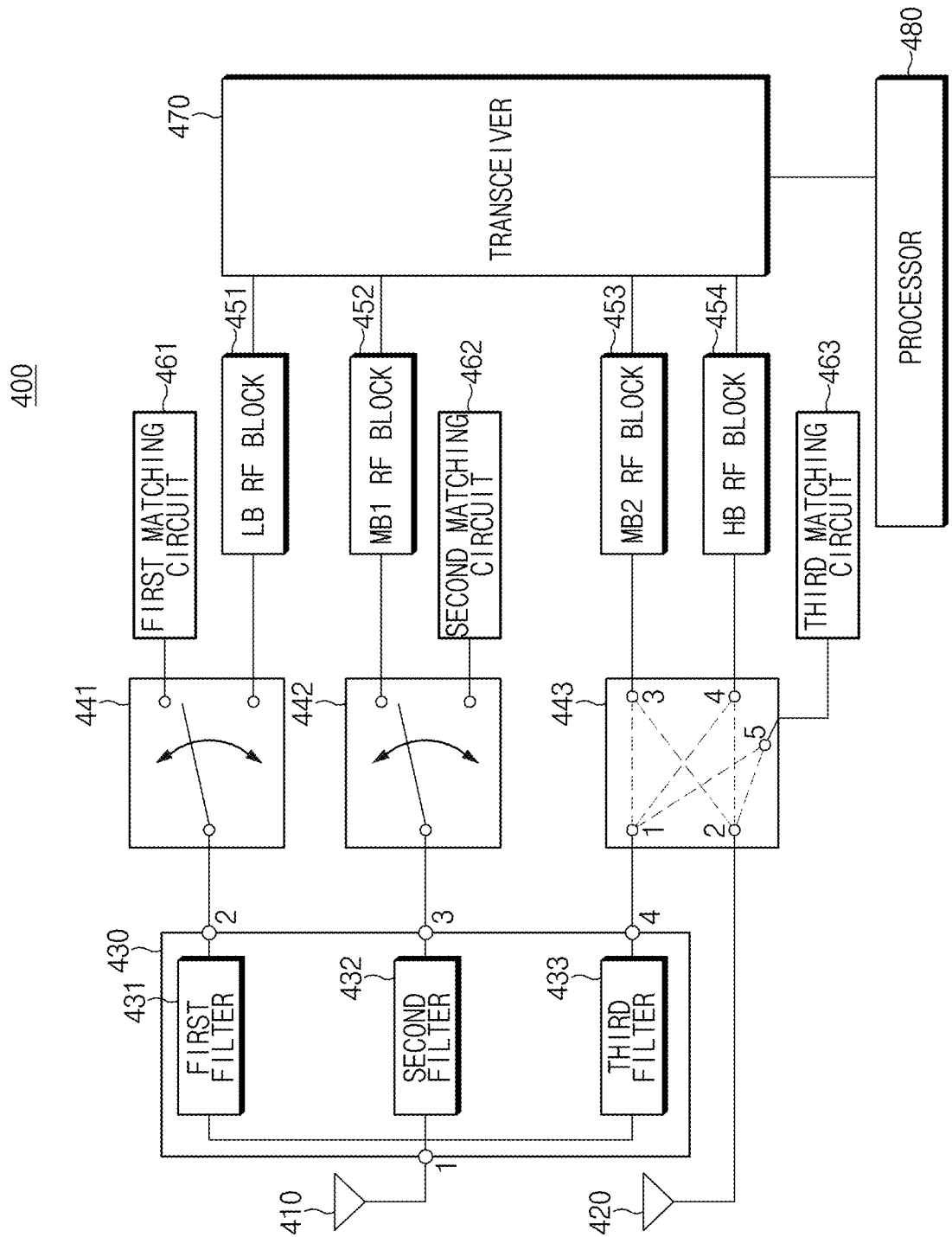

ELECTRONIC DEVICE INCLUDING ANTENNA

This application is the U.S. national phase of International Application No. PCT/KR2017/007159 filed Jul. 5, 2017 which designated the U.S. and claims priority to KR Patent Application No. 10-2016-0087276 filed Jul. 11, 2016, the entire contents of each of which are hereby incorporated by reference.

Technical Field

Embodiments of the present disclosure relate to an electronic device including an antenna receiving a signal in a plurality of frequency bands.

DESCRIPTION OF RELATED ART

An electronic device such as a smartphone, a tablet, or the like may communicate with a network by using an antenna. Unlike the $3^{rd}$ generation (3G) network where some frequency bands (e.g., 900 MHz, 1.8 GHz, 2.1 GHz, and the like) have been globally used, the 3G-next network (e.g., long term evolution (LTE), LTE-advanced (LTE-A), or the like) uses various frequency bands for each country and/or operator. For example, according to Tables 5.5-1 "E-UTRA Operating Bands" of 3GPP TS 36.101, nowadays, 30 or more frequency bands are commercialized. Accordingly, a recently released electronic device is equipped with one or more antennas covering a plurality of frequency bands for the purpose of supporting networks of various countries and operators.

However, a mounting space of an electronic device such as a smartphone or a tablet is insufficient to mount all antennas respectively corresponding to frequency bands. Also, in addition to an antenna for a cellular network such as LTE, antennas for GPS, Bluetooth, Wi-Fi, NFC, MST, and a wireless charging coil are mounted on the electronic device, thereby making it difficult to design an antenna for supporting the cellular network. As such, a design of a general antenna uses a radiator covering both a low frequency band and a mid-frequency band (low band+mid band) and/or a radiator covering both a low frequency band and a high frequency band (low band+high band), even though the efficiency of antenna (received signal strength) becomes low. For another example, a radiator may be designed to all cover the low frequency band, the mid-frequency band, and the high frequency band, but an antenna including the radiator may accompany many issues in terms of the received signal strength or signal isolation. For example, a part of RF blocks connected with a signal distributor (e.g., a multiplexer) for distributing a signal received by a radiator for each frequency band may cause an increase in insertion loss of the signal distributor.

SUMMARY

To the above-mentioned problems and/or disadvantages, embodiments of the present disclosure are to provide an electronic device which may reduce insertion loss of an antenna by utilizing a matching circuit.

An electronic device according to an embodiment of the present disclosure may include an antenna element configured to receive a signal in at least one frequency band of a first frequency band and a second frequency band, a signal distributor electrically connected with the antenna element, and including a first filter corresponding to the first frequency band and a second filter corresponding to the second frequency band, a matching circuit electrically connectable with the second filter, a transceiver electrically connected with the signal distributor, a switch connecting the second filter with the matching circuit or the transceiver, and a processor electrically connected with the transceiver.

An electronic device according to an embodiment of the present disclosure may include an antenna element configured to receive a signal in at least one frequency band of a first frequency band and a second frequency band, a signal distributor electrically connected with the antenna element, and including a first filter corresponding to the first frequency band and a second filter corresponding to the second frequency band, a transceiver electrically connected with the signal distributor, a switch selectively connecting the second filter with the transceiver, and a processor electrically connected with the transceiver.

An electronic device according to an embodiment of this disclosure may include an antenna element, a transceiver circuit including a first port transmitting or receiving a signal of a first frequency, and a second port transmitting or receiving a signal of a second frequency higher than the first frequency, a first filter electrically connected to the antenna element, a second filter electrically connected to the antenna element, a first RF front end electrically connected between the first port and the second port, a switching element including a first terminal, a second terminal, and a third terminal, and electrically connecting the first terminal selectively to the second terminal or the third terminal, the first terminal of the switching element being electrically connected to the second filter, a second RF front end electrically connected between the second terminal of the switching element and the second port, and a first impedance matching circuit electrically connected to the third terminal of the switching element.

SUMMARY

According to embodiments of the present disclosure, the received signal strength of an antenna may be improved by selectively connecting a matching circuit depending on a frequency band of a received signal.

Besides, a variety of effects directly or indirectly understood through this disclosure may be provided.

BRIEF DESCRIPTION OF THE DRAWINGS

FIG. 4 is a block diagram illustrating a configuration of the electronic device according to an embodiment.

DETAILED DESCRIPTION OF EXAMPLE EMBODIMENTS

Figure 1:
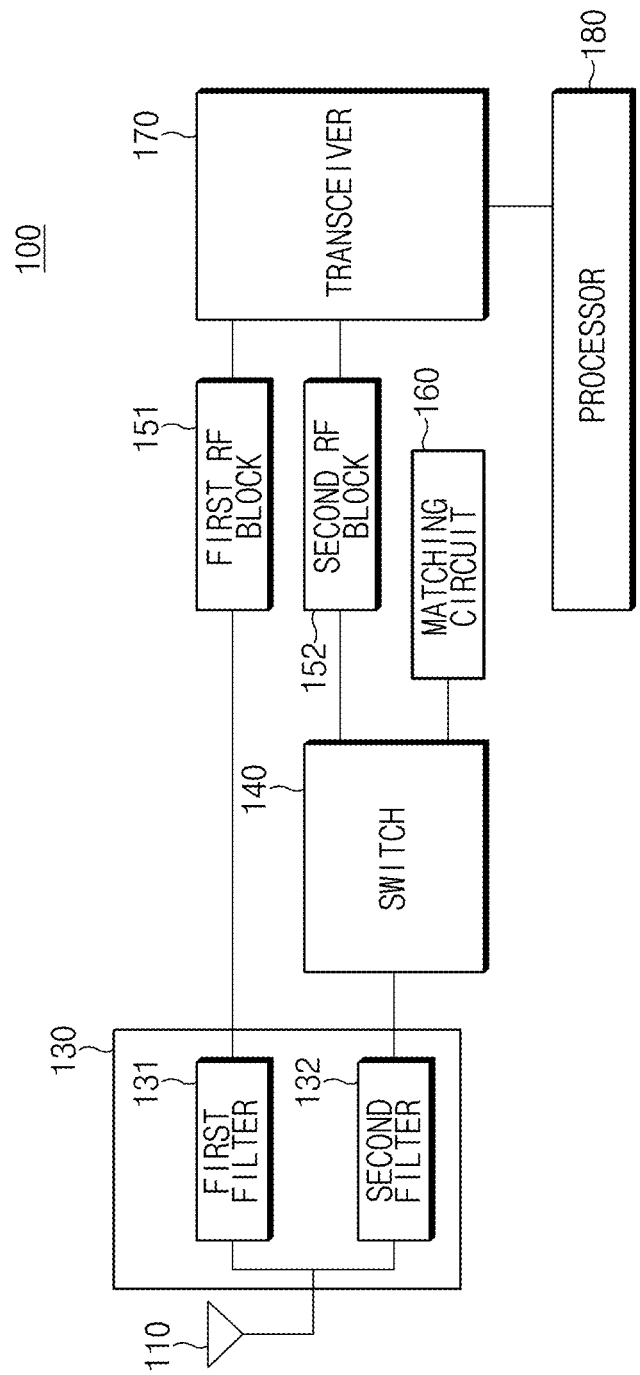
FIG. 1 is a block diagram illustrating a configuration of an electronic device according to an embodiment.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals. The terms of a singular form may include plural forms unless otherwise specified. In this disclosure, the expressions "A or B", "at least one of A or/and B", or "one or more of A or/and B", and the like may include any and all combinations of one or more of the associated listed items. The terms, such as "first", "second", and the like may be used to refer to various elements regardless of the order and/or the priority and to distinguish the relevant elements from other elements, but do not limit the elements. When an element (e.g., a first element) is referred to as being "(operatively or communicatively) coupled with/to" or "connected to" another element (e.g., a second element), the element may be directly coupled with/to or connected to the other element or an intervening element (e.g., a third element) may be present.

According to the situation, the expression "configured to" used in this disclosure may be used as, for example, the expression "suitable for", "having the capacity to", "adapted to", "made to", "capable of", or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, drones, automatic teller's machines (ATMs), points of sales (POSs) of stores, or internet of things (e.g., light bulbs, various sensors, sprinkler devices, fire alarms, thermostats, street lamps, toasters, exercise equipment, hot water tanks, heaters, boilers, and the like). According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be a flexible electronic device or a combination of two or more above-described devices. Furthermore, an electronic device according to an embodiment of this disclosure may not be limited to the above-described electronic devices. In this disclosure, the term "user" may refer to a person who uses an electronic device or may refer to a device (e.g., an artificial intelligence electronic device) that uses the electronic device.

In this disclosure, a frequency band may refer to a band defined in the 3rd generation partnership project (3GPP). Also, a bandwidth may indicate an uplink/downlink frequency range of a frequency band. In the FDD scheme, an uplink frequency range and a downlink frequency range are distinguished from each other; however, in the frequency division duplex (FDD) scheme, an uplink frequency range and a downlink frequency range may be the same as each other. Also, each frequency band may be classified as a low frequency band low-band, a middle frequency band mid-band, or a high frequency band high-band, depending on a bandwidth to use. For example, according to the 3GPP band definition, bands may be classified into three low/mid/high-band groups, as shown in Table 1 below, depending on an assigned bandwidth.

TABLE 1

| Band No. | Band Definition | Uplink Frequency Range | Downlink Frequency Range | FDD/TDD |
|---|---|---|---|---|
| 1 | Mid-Band | 1920-1980 | 2110-2170 | FDD |
| 2 | Mid-Band | 1850-1910 | 1930-1990 | FDD |
| 3 | Mid-Band | 1710-1785 | 1805-1880 | FDD |
| 4 | Mid-Band | 1710-1755 | 2110-2155 | FDD |
| 5 | Low-Band | 824-849 | 869-894 | FDD |
| 7 | High-Band | 2500-2570 | 2620-2690 | FDD |
| 8 | Low-Band | 880-915 | 925-960 | FDD |

TABLE 1-continued

| Band No. | Band Definition | Uplink Frequency Range | Downlink Frequency Range | FDD/TDD |
|---|---|---|---|---|
| 9 | Mid-Band | 1749.9-1784.9 | 1844.9-1879.9 | FDD |
| 10 | Mid-Band | 1710-1770 | 2110-2170 | FDD |
| 11 | Mid-Band | 1427.9-1452.9 | 1475.9-1500.9 | FDD |
| 12 | Low-Band | 698-716 | 728-746 | FDD |
| 13 | Low-Band | 777-787 | 746-756 | FDD |
| 14 | Low-Band | 788-798 | 758-768 | FDD |
| 17 | Low-Band | 704-716 | 734-746 | FDD |
| 18 | Low-Band | 815-830 | 860-875 | FDD |
| 19 | Low-Band | 830-845 | 875-890 | FDD |
| 20 | Low-Band | 832-862 | 791-821 | FDD |
| 21 | Mid-Band | 1447.9-1462.9 | 1495.5-1510.9 | FDD |
| 25 | Mid-Band | 1850-1915 | 1930-1995 | FDD |
| 26 | Low-Band | 814-849 | 859-894 | FDD |
| 28 | Low-Band | 703-748 | 758-803 | FDD |
| 33 | Mid-Band | 1900-1920 | 1900-1920 | TDD |
| 38 | High-Band | 2570-2620 | 2570-2620 | TDD |
| 39 | Mid-Band | 1880-1920 | 1880-1920 | TDD |
| 40 | High-Band | 2300-2400 | 2300-2400 | TDD |
| 41 | High-Band | 2496-2690 | 2496-2690 | TDD |
| 44 | Low-Band | 703-803 | 703-803 | TDD |

Each band may be categorized as a first frequency band, the bandwidth of which belongs to a first frequency range, a second frequency band, the bandwidth of which belongs to a second frequency range, and a third frequency band, the bandwidth of which belongs to a third frequency range. Herein, the second frequency range may be defined to be greater than a maximum value of the first frequency range and to be less than a minimum value of the third frequency range. In an embodiment, the first frequency band, the second frequency band, and the third frequency band may correspond to Low-Band, Mid-Band, and High-Band defined in the 3GPP. However, in an embodiment, the first frequency band, the second frequency band, and the third frequency band may be defined to be different from the 3GPP. For example, a band which uses a frequency of 2000 MHz or more may be defined as the third frequency band.

In an embodiment of the present disclosure, for convenience of description, the first frequency band may be understood as a low-band LB, the second frequency band may be understood as a mid-band MB, and the third frequency band may be understood as a high-band HB. For example, the LB may be about 700 to 900 MHz, the MB may be 1.4 to 2.2 GHz, and the HB may be 2.3 to 2.7 GHz. For another example, a first mid-band MB1 may be a frequency band including 1.5 GHz, and a second mid-band MB2 may be a frequency band including 1.7 GHz. In this case, the first frequency band may be understood as the LB, the second frequency band may be understood as the MB1, and the third frequency band may be understood as the MB2 and HB. For another example, the LB may be about 700 to 900 MHz, the MB1 may be 1.4 GHz to 2.2 GHz, the MB2 may be 2.3 GHz to 2.7 GHz, and the HB may be 5 GHz to 6 GHz. However, the criteria for categorization may be defined to be different from the above examples or the 3GPP standard, and the categorization into four or five or more frequency bands is possible.

Below, an electronic device according to various embodiments will be described with reference to the accompanying drawings.

FIG. 1 is a block diagram illustrating a configuration of an electronic device according to an embodiment.

Referring to FIG. 1, an electronic device 100 according to an embodiment may be a mobile device which a user utilizes. The electronic device 100 may be referred to as a "mobile device", a "mobile terminal", "user equipment (UE)", or the like.

The electronic device 100 may include an antenna element 110, a signal distributor 130, a switch 140, a first RF block (e.g., a first RF front end) 151, a second RF block (e.g., a second RF front end) 152, a matching circuit 160, a transceiver 170, and a processor 180.

The electronic device 100 illustrated in FIG. 1 may further include additional components, such as an application processor (AP), a memory, a display, and the like, in addition to the components illustrated. For example, the electronic device 100 may further include a touch integrated circuit (IC), a camera, a microphone, a speaker, various sensors, or the like.

The antenna element 110 may include one or more radiators. According to an embodiment, the antenna element 110 may include a radiator having a plurality of electrical paths as the antenna element 110 is bent or extended at or from one point. According to another embodiment, the antenna element 110 may be implemented with two or more radiators. The antenna element 110 may be configured to receive a signal in at least one frequency band of the first frequency band (e.g., an LB) and the second frequency band (e.g., an MB) through the plurality of electrical paths. An exemplary configuration of the antenna element 110 will be described with reference to FIGS. 8, 9, and 10.

The signal distributor 130 may be electrically connected with the antenna element 110. The signal distributor 130 may include one or more filters. According to an embodiment, the signal distributor 130 may include a multiplexer, and may be, for example, a diplexer. According to an embodiment, the signal distributor 130 may include a first filter 131 corresponding to the first frequency band and a second filter 132 corresponding to the second frequency band. For example, the first filter 131 may be a band pass filter which passes a signal in the first frequency band. Alternatively, the second filter 132 may be a band pass filter which passes a signal in the second frequency band. The signal distributor 130 may distribute a signal received by the antenna element 110 into two frequency bands. For example, when a signal including the first frequency band and the second frequency band is received by the antenna element 110, the signal distributor 130 may transmit a component of the first frequency band of the signal to a first RF block 151 and may transmit a component of the second frequency band to the switch 140.

According to various embodiments, the first RF block 151 may process a signal in the first frequency band. A second RF block 152 may process a signal in the second band. In this disclosure, an RF block may be an RF front end. Each RF block may include the switch 140, a duplexer, a power amplifier, or the like. For example, the antenna element 110 may simultaneously transmit and receive a low frequency signal corresponding to 700 MHz to 1 GHz, and a high frequency signal corresponding to 1.7 GHz to 2.2 GHz. In the case where the electronic device 100 supports LTE Band 5 (824 to 894 MHz), the antenna element 110 may be connected to the first RF block 151 through the first filter 131 in the signal distributor 130. In the case where the electronic device 100 supports LTE Band 3 (1710 to 1880 MHz), the antenna element 110 may be connected to the second RF block 152 through the second filter 132 in the signal distributor 130 and the switch 140.

According to various embodiments, the matching circuit (or an impedance matching circuit) 160 may be electrically connected with the switch 140. For example, the matching circuit 160 may be electrically connected with the second filter 132 through the switch 140. The matching circuit 160 may be, for example, a circuit including a lumped element, or may be a circuit including a microstrip. Impedance of the matching circuit 160 may be infinite or may be approximate to "0". For example, the matching circuit 160 may be a line connecting one end of the switch 140 and a ground. The matching circuit 160 which is an optional component may not be included in the electronic device 100.

According to various embodiments, the switch (or a switching element) 140 may be electrically connected with the second filter 132, the second RF block 152, and the matching circuit 160. The switch 140 may be electrically connected with the transceiver 170 through the second RF block 152. For example, a first terminal of the switch 140 may be connected with the second filter 132, a second terminal thereof may be connected with the second RF block 152, and a third terminal thereof may be connected with the matching circuit 160. According to an embodiment, the switch 140 may selectively connect the second filter 132 with the matching circuit 160 or the transceiver 170. For example, the switch 140 may operate such that the first terminal and the second terminal are connected, and may operate such that the first terminal and the third terminal are connected. For another example, in the case where the electronic device 100 does not include the matching circuit 160, the switch 140 may operate such that the first terminal and the second terminal are connected, and may operate such that the first terminal and the second terminal are disconnected. The switch 140 may be implemented with, for example, a single pole double throw (SPDT) switch. An operation of the switch 140 may be controlled by the processor 180.

According to various embodiments, the transceiver 170 may be electrically connected with the first RF block 151 and the second RF block 152. The transceiver 170 may include a first port transmitting or receiving a signal of a first frequency and a second port transmitting or receiving a signal of a second frequency higher than the first frequency. The transceiver 170 may be electrically connected with the signal distributor 130 through the first RF block 151 and the second RF block 152. The transceiver 170 may be electrically connected with the processor 180.

The processor 180 may be, for example, a communication processor (CP). The processor 180 may control the switch 140 or the like directly or through the transceiver 170.

According to various embodiments, the processor 180 may determine a frequency band of a signal received by the antenna element 110. For example, when a signal is received by the antenna element 110, the processor 180 may recognize a frequency band, in which the signal is included, from among the first frequency band and the second frequency band. The processor 180 may control the switch 140 depending on the frequency band of the signal.

According to various embodiments, when a signal in at least the second frequency band is received by the antenna element 110, the processor 180 may control the switch 140 such that the second filter 132 is electrically connected with the transceiver 170. For example, when it is determined that the second frequency band is included in the signal, the processor 180 may control the switch 140 such that the second filter 132 and the second RF block 152 are electrically connected. For another example, when a signal of a second frequency is transmitted through the second port of the transceiver 170, the processor 180 may allow the switch 140 to electrically connect the first terminal with the second terminal. As such, when a signal in the second frequency band is received, the signal may be processed by the second RF block 152 for the second frequency band.

According to various embodiments, when a signal in any other frequency band except for the second frequency band is received by the antenna element 110 (e.g., when a signal in the first frequency band is received), the processor 180 may control the switch 140 such that the second filter 132 is electrically connected with the matching circuit 160. For example, when it is determined that the second frequency band is not included in the signal, the processor 180 may control the switch 140 such that the second filter 132 and the matching circuit 160 are electrically connected. For another example, when a signal of a first frequency is transmitted through the first port of the transceiver 170, the processor 180 may allow the switch 140 to electrically connect the first terminal with the third terminal. The impedance of the matching circuit 160 may be a value at which insertion loss is minimized, in the case where the matching circuit 160 is connected with the second filter 132. According to an embodiment, an impedance value of the matching circuit 160 may be different from an impedance value of the second RF block 152.

According to various embodiments, when a signal in any other frequency band except for the second frequency band is received by the antenna element 110 (e.g., when a signal in the first frequency band is received), the processor 180 may control the switch 140 such that the transceiver 170 and the second filter 132 are disconnected. For example, when it is determined that the second frequency band is not included in the signal, the processor 180 may control the switch 140 such that the second filter 132 and the second RF block 152 are disconnected. As such, the issue that the insertion loss increases may be prevented by adjusting the impedance of the first filter having an influence on the second RF block 152.

Figure 2:
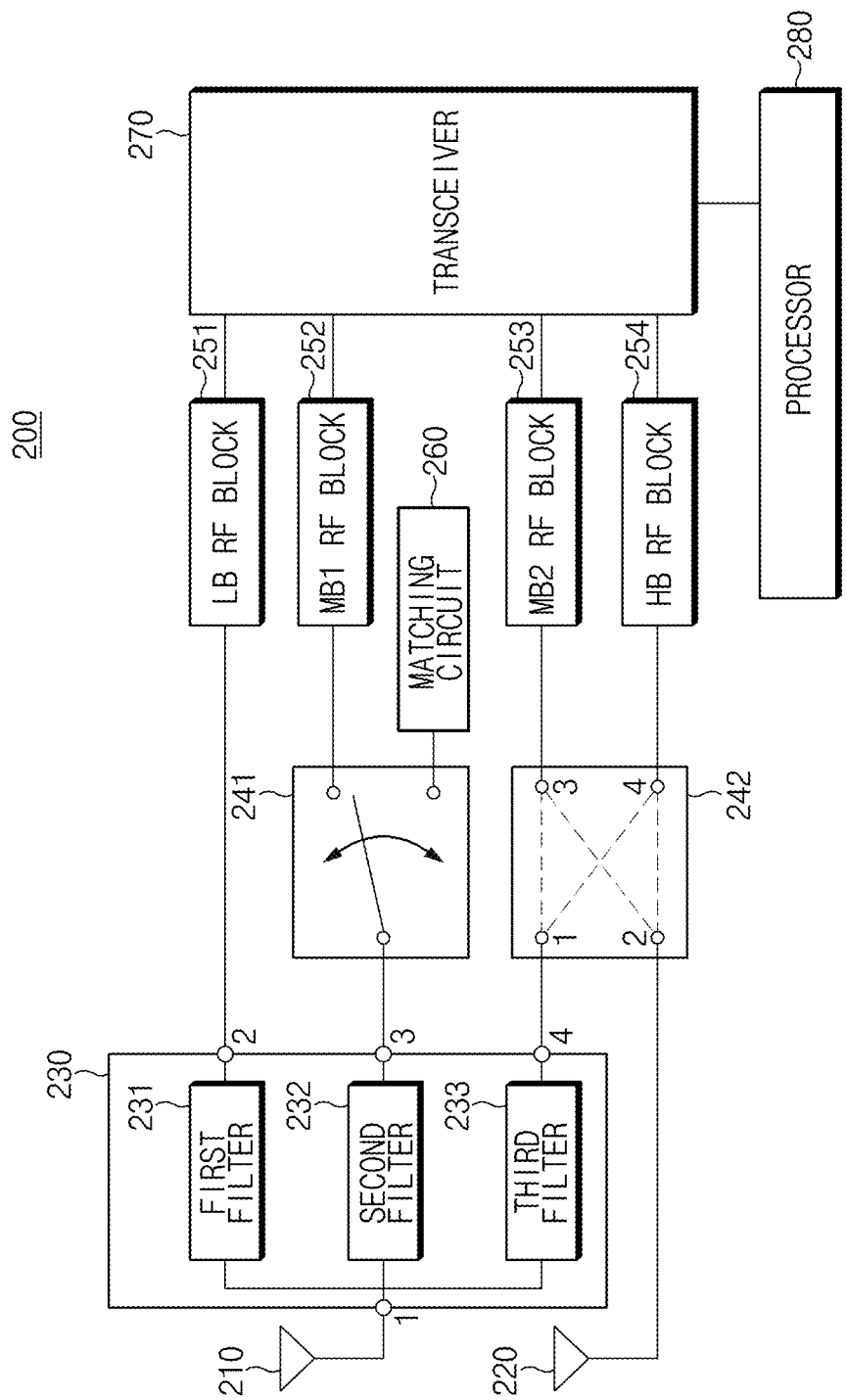
FIG. 2 is a block diagram illustrating a configuration of the electronic device according to an embodiment.

FIG. 2 is a block diagram illustrating a configuration of an electronic device according to an embodiment.

Referring to FIG. 2, an electronic device 200 according to an embodiment may be a mobile device which a user utilizes. The electronic device 200 may be referred to as a "mobile device", a "mobile terminal", "user equipment (UE)", or the like.

The electronic device 200 may include a first antenna element 210, a second antenna element 220, a signal distributor 230, a first switch 241, a second switch 242, an LB RF block 251, an MB1 RF block 252, an MB2 RF block 253, an HB RF block 254, a matching circuit 260, a transceiver 270, and a processor 280.

The electronic device 200 illustrated in FIG. 2 may further include additional components, such as an application processor (AP), a memory, a display, and the like, in addition to the components illustrated. For example, the electronic device 100 may further include a touch integrated circuit (IC), a camera, a microphone, a speaker, various sensors, or the like.

According to various embodiments, the first antenna element 210 may be configured to receive a signal in the LB, MB1, MB2, and/or HB. In an embodiment of the present disclosure, the LB may be understood as the first frequency band, the MB2 may be understood as the second frequency band, and the HB may be understood as the third frequency band. In another embodiment, the LB may be understood as the first frequency band, the MB1 may be understood as the second frequency band, the MB2 may be understood as the third frequency band, and the HB may be understood as a fourth frequency band. The first antenna element 210 may be implemented to be similar to the antenna element 110 illustrated in FIG. 1.

According to various embodiments, the second antenna element 220 may include a radiator for receiving a signal in a specific frequency band for carrier aggregation (CA). According to an embodiment, the second antenna element 220 may be configured to receive a signal in the MB2 and/or HB. For example, the second antenna element 220 may include a radiator for receiving a signal corresponding to Band 41 for the purpose of performing Band 1 to Band 41 CA. A signal corresponding to Band 1 may be received by the first antenna element 210. The second antenna element 220 may be electrically connected with the transceiver 270 through the MB2 RF block 253 or the HB RF block 254. The second antenna element 220 may be implemented with a flexible printed circuit board (FPCB). An exemplary configuration of the second antenna element 220 will be described with reference to FIG. 10.

According to various embodiments, the signal distributor 230 may be electrically connected with the first antenna element 210. The signal distributor 230 may be a triplexer including three filters. The signal distributor 230 may include, for example, a first filter 231 corresponding to the LB, a second filter 232 corresponding to the MB1, and a third filter 233 corresponding to the HB. For example, the first filter 231 may be a band pass filter which passes a signal in the LB, the second filter 232 may be a band pass filter which passes a signal in the MB1, and the third filter 233 may be a band pass filter which passes a signal in the MB2 and HB. The signal distributor 230 may separate a signal received by the first antenna element 210 into three frequency bands. For example, when a signal including the LB, MB1, MB2, and HB is received by the first antenna element 210, the signal distributor 230 may transmit an LB signal of the signal to the LB RF block 251, may transmit an MB1 signal to the first switch 241, and may transmit an MB1 and HB signal to the second switch 242.

According to various embodiments, the LB RF block (or a first RF block) 251, the MB1 RF block (or a third RF block) 252, the MB2 RF block (or a third RF block) 253, and the HB RF block (or a fourth RF block) 254 may process the LB signal, the MB1 signal, the MB2 signal, and the HB signal, respectively. Each of the LB RF block 251, the MB1 RF block 252, the MB2 RF block 253, and the HB RF block 254 may be implemented to be similar to the first RF block 151 or the second RF block 152 illustrated in FIG. 1.

According to various embodiments, the matching circuit 260 may be electrically connected with the first switch 241. According to an embodiment, the matching circuit 260 may be electrically connected with the second filter 232 through the first switch 241. The matching circuit 260 may be implemented to be similar to the matching circuit 160 illustrated in FIG. 1. According to another embodiment, the matching circuit 260 which is an optional component may not be included in the electronic device 200.

According to various embodiments, the first switch 241 may be electrically connected with the second filter 232, the MB1 RF block 252, and the matching circuit 260. The first switch 241 may selectively connect the second filter 232 with the MB1 RF block 252 or the matching circuit 260. The first switch 241 may be implemented to be similar to the switch 140 illustrated in FIG. 1.

According to various embodiments, the second switch 242 may be electrically connected with the third filter 233, the MB2 RF block 253, and the HB RF block 254. For example, a first terminal of the second switch 242 may be connected with the third filter 233, a second terminal thereof may be connected with the second antenna element 220, a third terminal thereof may be connected with the MB2 RF block 253, and a fourth terminal thereof may be connected with the HB RF block 254. According to various embodiments, the second switch 242 may selectively connect the third filter 233 or the second antenna element 220 with the MB2 RF block 253 or the HB RF block 254. For example, the second switch 242 may operate such that the first terminal is connected with the third terminal or the fourth terminal. Alternatively, the second switch 242 may operate such that the second terminal is connected with the third terminal or the fourth terminal. The second switch 242 may be implemented with, for example, a double pole double throw (DPDT) switch. The switch operation may be controlled by the processor 280.

According to various embodiments, the transceiver 270 may be electrically connected with the LB RF block 251, the MB1 RF block 252, the MB2 RF block 253, and the HB RF block 254. The transceiver 270 may include a first port connected to the LB RF block 251, a second port connected with the MB1 RF block 252, a third port connected with the MB2 RF block 253, and a fourth port connected with the HB RF block 254. The transceiver 270 may be electrically connected with the signal distributor 230 and/or the second antenna element 220 through the LB RF block 251, the MB1 RF block 252, the MB2 RF block 253, and/or the HB RF block 254. The transceiver 270 may be electrically connected with the processor 280.

The processor 280 may be, for example, a CP. The processor 280 may control the first switch 241 and the second switch 242 directly or through the transceiver 270.

According to various embodiments, when a signal in at least the MB1 is received by the first antenna element 210, the processor 280 may control the first switch 241 such that the second filter 232 is electrically connected with the transceiver 270. For example, when it is determined that the MB1 is included in the signal, the processor 280 may control the first switch 241 such that the second filter 232 and the MB1 RF block 252 are electrically connected. As such, when the signal in the MB1 is received, the signal may be processed by the MB1 RF block 252.

According to various embodiments, when a signal in any other frequency band except for the MB1 is received by at least one of the first antenna element 210 and the second antenna element 220 (e.g., when a signal in the LB, MB2, and/or HB except for the MB1 is received), the processor 280 may control a switch such that the second filter 232 is electrically connected with the matching circuit 260. For example, when it is determined that the MB1 is not included in the signal, the processor 280 may control the first switch 241 such that the second filter 232 and the matching circuit 260 are electrically connected. As such, the insertion loss may be prevented from increasing due to impedance mismatching of the first filter 231 and/or the third filter 233, which occurs due to the influence of the MB1 RF block 252. For example, the impedance of the matching circuit 260 may be a value at which insertion loss is minimized by adjusting the impedance of the first filter 231 and/or the third filter 233 in the case where the matching circuit 260 is connected with the second filter 232. An impedance value of the matching circuit 260 may be different from an impedance value of the MB1 RF block 252.

According to various embodiments, when a signal in any other frequency band except for the MB1 is received by at least one of the first antenna element 210 and the second antenna element 220 (e.g., when a signal in the LB, MB2, and/or HB except for the MB1 is received), the processor 280 may control the first switch 241 such that the second filter 232 is disconnected from the transceiver 270. For example, when it is determined that the second frequency band (e.g., MB1) is not included in the signal, the processor 280 may control the first switch 241 such that the second filter 232 and the MB1 RF block 252 are disconnected. As such, the insertion loss may be prevented from increasing due to impedance mismatching of the first filter 231 and/or the third filter 233, which occurs due to the influence of the MB1 RF block 252.

According to various embodiments, when a signal in the MB2 is received by at least one of the first antenna element 210 and the second antenna element 220, the processor 280 may control the second switch 242 such that the third filter 233 is electrically connected with the MB2 RF block 253. When a signal in the HB is received by at least one of the first antenna element 210 and the second antenna element 220, the processor 280 may control the second switch 242 such that the third filter 233 is electrically connected with the HB RF block 254. As such, when the signal in the MB2 is received, the signal may be processed by the MB2 RF block 253; when the signal in the HB is received, the signal may be processed by the HB RF block 254.

Table 2 shows S21 according to frequencies of an antenna included in an electronic device according to an embodiment and an antenna included in an electronic device according to a comparative example. The electronic device according to an embodiment is the electronic device 200 illustrated in FIG. 2, and the electronic device according to the comparative example is a device which does not include the first switch 241 and the matching circuit 260. S21 of Table 2 is a value measured in the MB1 while the matching circuit 260 of the electronic device 200 is connected with the signal distributor 230.

TABLE 2

| | Frequency(GHz) | 1.710 | 1.785 | 1.850 | 1.980 | 2.110 | 2.170 |
|---|---|---|---|---|---|---|---|
| S21 (dB) | Comparative | −4.0151 | −2.0051 | −1.8975 | −1.7892 | −1.8585 | −1.8197 |
| | Embodiment | −2.6254 | −1.9351 | −1.8451 | −1.7091 | −1.6903 | −1.7475 |

Referring to Table 2, S21 of the antenna included in the electronic device 200 according to an embodiment is higher at all frequencies compared with S21 of the antenna included in the electronic device according to the comparative example. For example, it may be observed that S21 is greatly improved at 1.710 GHz being a low frequency in the MB1.

Table 3 shows a transmission power according to frequencies of an antenna included in an electronic device according to an embodiment and an antenna included in an electronic device according to a comparative example. The electronic device according to an embodiment is the electronic device 200 illustrated in FIG. 2, and the electronic device according to the comparative example is a device which does not include the first switch 241 and the matching circuit 260 illustrated in FIG. 2. The transmission power of Table 3 is a value measured in an LTE Band 3 and a DCS (Digital Cellular System) band while the matching circuit 260 of the electronic device 200 is connected with the signal distributor 230.

TABLE 3

| | | Band | | | | | |
|---|---|---|---|---|---|---|---|
| | | LTE Band3 (BW: 10 MHz) | | | DCS Band | | |
| | Channel | Ch. 1250 | Ch. 1550 | Ch. 1900 | Ch. 512 | Ch. 674 | Ch. 885 |
| Tx. Power | Comparative | 22.8 dBm | 23.5 dBm | 23.8 dBm | 28.1 dBm | 29.2 dBm | 29.6 dBm |
| | Embodiment | 23.5 dBm | 23.6 dBm | 23.8 dBm | 29.1 dBm | 29.5 dBm | 29.6 dBm |

Referring to Table 3, the transmission power of the antenna included in the electronic device 200 according to an embodiment is higher at all frequencies compared with the transmission power of the antenna included in the electronic device according to the comparative example. For example, it may be observed that the transmission power is greatly improved at Ch.1250 corresponding to a low frequency band in the LTE Band 3 and at Ch.512 corresponding to a low frequency band in the DCS Band.

Figure 3:
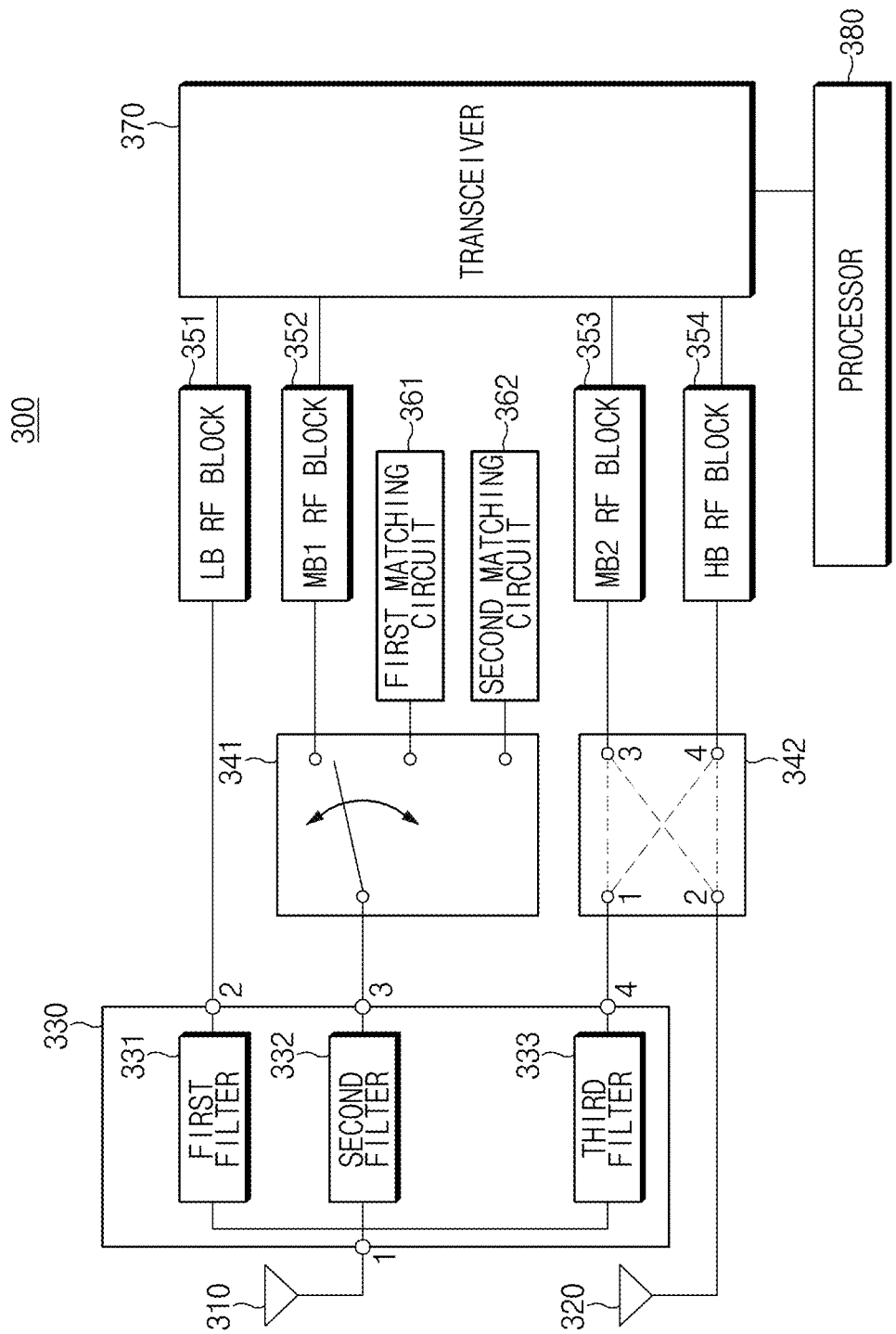
FIG. 3 is a block diagram illustrating a configuration of an electronic device according to an embodiment.

FIG. 3 is a block diagram illustrating a configuration of an electronic device according to an embodiment.

Referring to FIG. 3, an electronic device 300 may include a first antenna element 310, a second antenna element 320, a signal distributor 330, a first switch 341, a second switch 342, an LB RF block 351, an MB1 RF block 352, an MB2 RF block 353, an HB RF block 354, a first matching circuit 361, a second matching circuit 362, a transceiver 370, and a processor 380. The first antenna element 310, the second antenna element 320, the signal distributor 330, the second switch 342, the LB RF block 351, the MB1 RF block 352, the MB2 RF block 353, the HB RF block 354, the first matching circuit 361, the transceiver 370, and the processor 380 may be implemented to be similar to the first antenna element 210, the second antenna element 220, the signal distributor 230, the second switch 242, the LB RF block 251, the MB1 RF block 252, the MB2 RF block 253, the HB RF block 254, the matching circuit 260, the transceiver 270, and the processor 280 illustrated in FIG. 2.

According to various embodiments, the second matching circuit 362 may be electrically connected with the first switch 341. According to an embodiment, the second matching circuit 362 may be electrically connected with a second filter 332 through the first switch 341. The second matching circuit 362 may be implemented to be similar to the matching circuit 160 illustrated in FIG. 1. Impedance of the second matching circuit 362 may be different from impedance of the first matching circuit 361.

According to various embodiments, the first switch 341 may be electrically connected with the second filter 332, the first matching circuit 361, the second matching circuit 362, and the MB1 RF block 352. The first switch 341 may selectively connect the second filter 332 with the first matching circuit 361, the second matching circuit 362, and the transceiver 370 (through the MB1 RF block 352). The first switch 341 may be implemented with, for example, a single pole three throw (SP3T) switch. An operation of the first switch 341 may be controlled by the processor 380.

According to various embodiments, when a signal in at least the MB1 is received by the first antenna element 310, the processor 380 may control a switch such that the second filter 332 is electrically connected with the transceiver 370 through the MB1 RF block 352. As such, when the signal in the MB1 is received, the signal may be processed by the MB1 RF block 352.

According to various embodiments, when an LB signal, which does not include the MB1, is received by the first antenna element 310, the processor 380 may control a switch such that the second filter 332 is electrically connected with the first matching circuit 361. As such, the insertion loss of a first filter 331 may be prevented from increasing, and impedance mismatching of the first filter 331 may be prevented from occurring due to the influence of the MB1 RF block 352. The impedance of the first matching circuit 361 may be a value at which the insertion loss of the first filter 331 is minimized in the case where the first matching circuit 361 is connected with the second filter 332.

According to various embodiments, when an MB2 signal (not including MB1) or an HB signal is received by the first antenna element 310 and/or the second antenna element 320, the processor 380 may control a switch such that the second filter 332 is electrically connected with the second matching circuit 362. As such, the insertion loss of a third filter 333 may be prevented from increasing, and impedance mismatching of the third filter 333 may be prevented from occurring due to the influence of the MB1 RF block 352. The impedance of the second matching circuit 362 may be a value at which the insertion loss of the third filter 333 is minimized in the case where the second matching circuit 362 is connected with the third filter 333.

FIG. 4 is a block diagram illustrating a configuration of an electronic device according to an embodiment.

Referring to FIG. 4, an electronic device 400 may include a first antenna element 410, a second antenna element 420, a signal distributor 430, a first switch 441, a second switch 442, a third switch 443, an LB RF block 451, an MB1 RF block 452, an MB2 RF block 453, an HB RF block 454, a first matching circuit 461, a second matching circuit 462, a third matching circuit 463, a transceiver 470, and a processor 480. The first antenna element 410, the second antenna element 420, the signal distributor 430, the second switch 442, the third switch 443, the LB RF block 451, the MB1 RF block 452, the MB2 RF block 453, the HB RF block 454, the second matching circuit 462, the transceiver 470, and the processor 480 may be implemented to be similar to the first antenna element 210, the second antenna element 220, the signal distributor 230, the first switch 241, the second switch 242, the LB RF block 251, the MB1 RF block 252, the MB2 RF block 253, the HB RF block 254, the matching circuit 260, the transceiver 270, and the processor 280 illustrated in FIG. 2.

According to various embodiments, the first matching circuit 461 may be electrically connected with the first switch 441. According to an embodiment, the first matching circuit 461 may be electrically connected with a first filter 431 through the first switch 441. The first matching circuit 461 may be implemented to be similar to the matching circuit 160 illustrated in FIG. 1. Impedance of the first matching circuit 461 may be different from impedance of the second matching circuit 462. Alternatively, an impedance value of the first matching circuit 461 may be different from an impedance value of the LB RF block 451.

According to various embodiments, the third matching circuit 463 may be electrically connected with the third switch 443. According to an embodiment, the third matching circuit 463 may be electrically connected with a third filter 433 through the third switch 443. The third matching circuit 463 may be implemented to be similar to the matching circuit 160 illustrated in FIG. 3. Impedance of the third matching circuit 463 may be different from impedance of the first matching circuit 461 and the second matching circuit 462.

According to various embodiments, the first switch 441 may be electrically connected with the first filter 431, the first matching circuit 461, and the LB RF block 451. The first switch 441 may selectively connect the first filter 431 with the first matching circuit 461 or the transceiver 470 (through the LB RF block 4451). The first switch 441 may be implemented with, for example, a single pole double throw (SPDT) switch. An operation of the first switch 441 may be controlled by the processor 480.

According to various embodiments, the third switch 443 may be electrically connected with the second antenna element 420, the third filter 433, the third matching circuit 463, the MB2 RF block 453, and the HB RF block 454. The third switch 443 may selectively connect the third filter 433 with the third matching circuit 463 or the transceiver 470 (through the MB2 RF block 453 or the HB RF block 454). The third switch 443 may be implemented with, for example, a double pole three throw (DP3T) switch. An operation of the third switch 443 may be controlled by the processor 480.

According to various embodiments, when a signal in the LB is received by the first antenna element 410, the processor 480 may control the second switch 442 and/or the third switch 443 such that a second filter 432 and/or the third filter 433 is electrically connected with the second matching circuit 462 and/or the third matching circuit 463, respectively. As such, the insertion loss of the third filter 433 may be prevented from increasing, and impedance of the first filter 431 may be prevented from being mismatched due to the influence of the MB1 RF block 452, the MB2 RF block 453, or the HB RF block 454.

According to various embodiments, when a signal in the MB1 is received by the first antenna element 410, the processor 480 may control the first switch 441 and/or the third switch 443 such that the first filter 431 and/or the third filter 433 is electrically connected with the first matching circuit 461 and/or the third matching circuit 463, respectively. As such, the insertion loss of the second filter 432 may be prevented from increasing, and impedance of the second filter 432 may be prevented from being mismatched due to the influence of the LB RF block 451, the MB2 RF block 453, or the HB RF block 454.

According to various embodiments, when a signal in the MB2 or a signal in the HB is received by the first antenna element 410 and/or the second antenna element 420, the processor 480 may control the first switch 441 and/or the second switch 442 such that the first filter 431 and/or the second filter 432 is electrically connected with the first matching circuit 461 and/or the second matching circuit 462, respectively. As such, the insertion loss of the third filter 433 may be prevented from increasing, and impedance of the third filter 433 may be prevented from being mismatched due to the influence of the LB RF block 451 or the MB1 RF block 452.

Figure 5A:
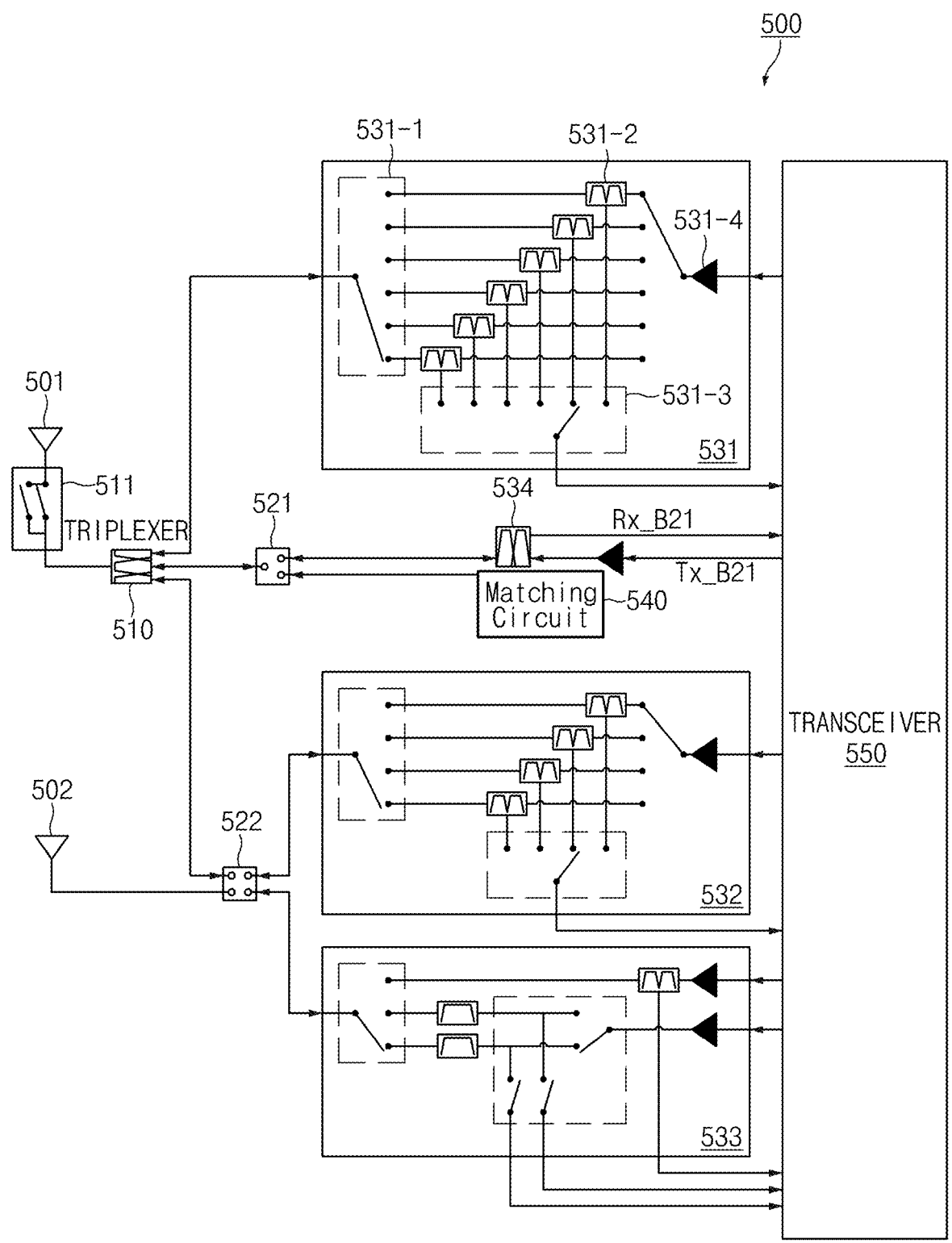
FIGS. 5A and 5B are block diagrams illustrating a detailed configuration of an electronic device according to an embodiment.
Figure 5B:
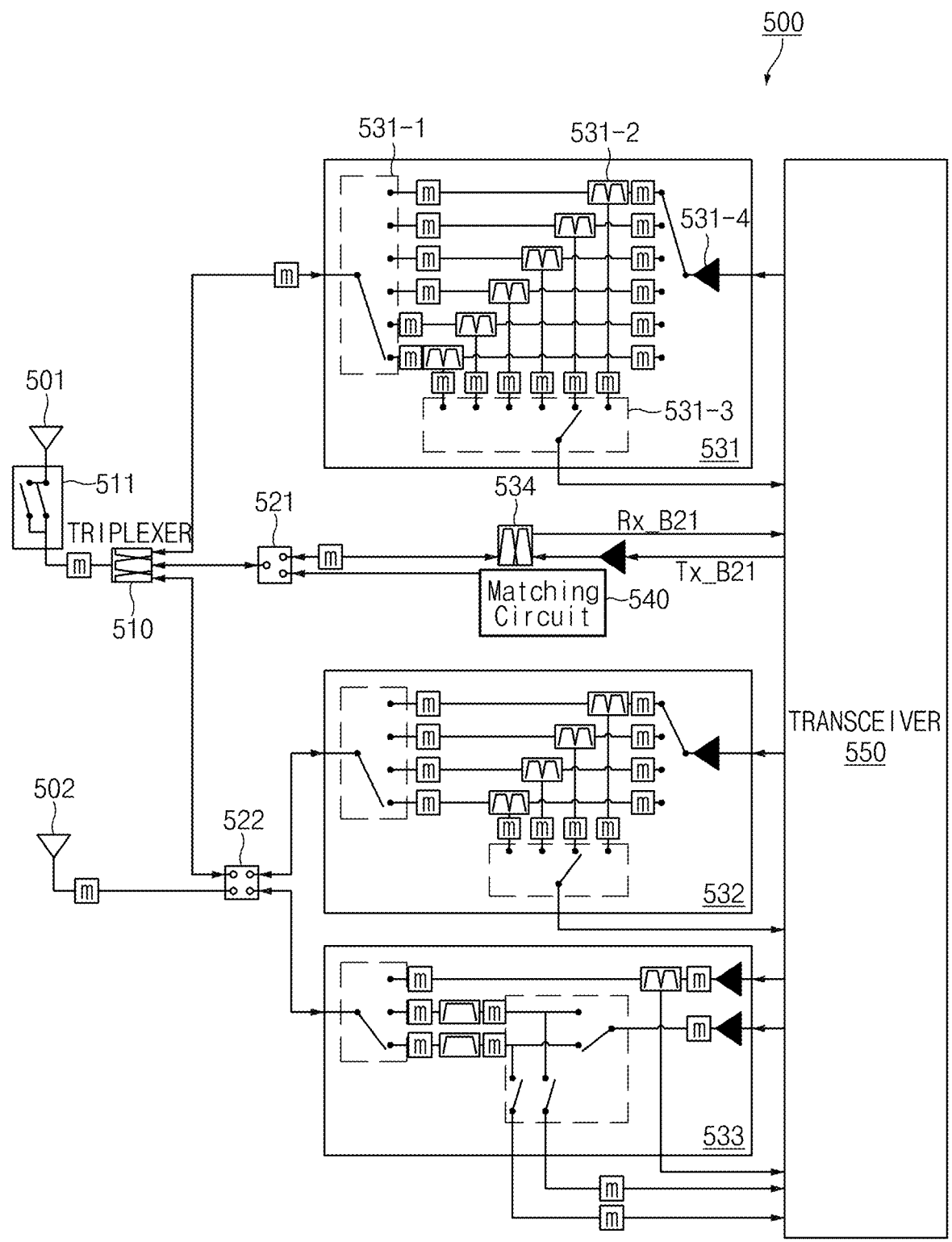

FIGS. 5A and 5B are block diagrams illustrating a detailed configuration of an electronic device according to an embodiment.

According to various embodiments of the present disclosure, referring to FIG. 5, an electronic device 500 may include a first antenna element 501, a second antenna element 502, a feeding switch 511, a triplexer 510, a first switch 521, a second switch 522, a first RF block 531, a second RF block 532, a third RF block 533, a duplexer 534, a matching circuit 540, and a transceiver 550. The electronic device 500 may be understood as a detailed block diagram of the electronic device 100, 200, 300, or 400. For example, the first antenna element 501, the second antenna element 502, the triplexer 510, the first switch 521, the second switch 522, the first RF block 531, the second RF block 532, the third RF block 533, the matching circuit 540, and the transceiver 550 may correspond to the first antenna element 210, the second antenna element 220, the signal distributor 230, the first switch 241, the second switch 242, the LB RF block 251, the MB2 RF block 253, the HB RF block 254, the matching circuit 260, and the transceiver 270 of FIG. 2. Also, the feeding switch 511 may correspond to a switch 951 of FIG. 9. Thus, additional description will be omitted to avoid redundancy.

For example, the first RF block 531, the second RF block 532, or the third RF block 533 may include a switch, a power amplifier module (PAM), a low noise amplifier (LNA), various filters, and/or a duplexer. For example, the first RF block 531 may include switches 531-1 and 531-3, a duplexer 531-2, and a power amplifier 531-4. For example, the first antenna element 501 may transmit and receive a signal corresponding to 700 to 900 MHz and 1.4 GHz to 2.2 GHz or a signal corresponding to 700 to 900 MHz and 2.2 GHz to 2.7 GHz; a signal corresponding to 700 to 900 MHz in the transmitted and received signal may be filtered by the triplexer 510 and may then be provided to the first RF block 531. The first RF block 531 may control the switches 531-1 and 531-3 so as to be connected with a specific band (e.g., Band 5), which corresponds to the above frequency range, from among Bands 5, 12, 13, 14, 17, and 18 depending on settings of a band available or preferred in the electronic device 500. The settings of the band may vary according to a country where the electronic device 500 is located, an operator of a network to which the electronic device 500 connects, or the like. In the case where a country or a mobile network operator where the electronic device 500 is located is changed, the switches 531-1 and 531-3 may be connected with another port (band).

According to various embodiments, in the case of a frequency duplex division (FDD) communication scheme, since frequency ranges used for transmission and reception are different from each other in the same band, a duplexer is required for each band. For example, the duplexer 531-2 may be interposed between the power amplifier 531-4 and the switch 531-1 for each band in the first RF block 531.

According to various embodiments, in the case of a time division duplex (TDD) communication scheme, a duplexer may not be required because the same frequency is used in transmission and reception, but a switch circuit may be used from transmission and reception separation. For example, the third RF block 533 may support three bands; one of the three bands may correspond to an FDD band (a band connected with an amplifier and a switch through a duplexer), and two of the three bands may correspond to TDD bands.

According to various embodiments, each of the RF modules 531, 532, and 533 may selectively connect an antenna and a duplexer through a switch in a module, depending on a band to be used. In the case of transmitting a signal, a duplexer may transmit a Tx signal provided from a power amplifier to an antenna element (e.g., the antenna element 501) through a switch (e.g., the switch 531-1). An Rx signal passing through a duplexer may be transmitted to the transceiver 540 through any other switch (e.g., the switch 531-3).

According to various embodiments, the transceiver 540 may convert the received signal to a baseband signal or may generate a transmit signal by converting a baseband signal into an RF band signal. The generated transmit signal may be provided to a power amplifier, may be amplified by the power amplifier, and may be transmitted to a network through the antenna element 501 or 502.

According to various embodiments, the triplexer 510 may separate a signal received by the first antenna element 501 for each frequency band. For example, when a signal in the MB1 is separated, for example, in the case where the signal in the MB1 is included, the electronic device 500 may allow the first switch 521 to connect the triplexer 510 with the duplexer 534 (or an MB1 RF block). For another example, when the signal in the MB1 is not separated, for example, in the case where the signal in the MB1 is not included, the electronic device 500 may allow the first switch 521 to connect the triplexer 510 with the matching circuit 540. A signal passing through the duplexer 534 may be converted to a baseband signal by the transceiver 540.

According to various embodiments, as illustrated in FIG. 5B, the electronic device 500 may further include matching circuits "m" at various locations. The matching circuits "m" may be positioned at various locations on an electrical path between the antenna elements 501 and 502 and the transceiver 550. Circuits included in the respective matching circuits "m" may be different from each other.

Figure 6:
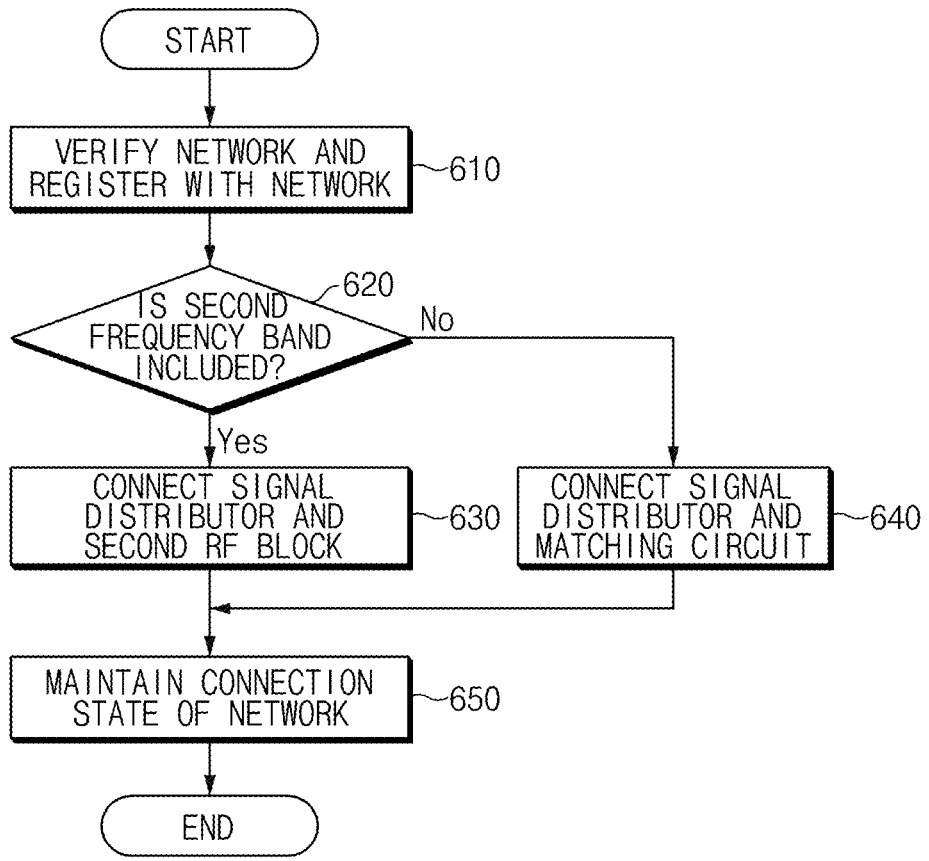
FIG. 6 is a flowchart for describing a method for controlling an antenna included in an electronic device according to an embodiment.

FIG. 6 is a flowchart for describing a method for controlling an antenna included in an electronic device according to an embodiment.

Below, it is assumed that the electronic device 100 of FIG. 1 performs a process of FIG. 6. However, it is obvious to those skilled in the art that the same description is applied to the electronic device 200 of FIG. 2, the electronic device 300 of FIG. 3, and the electronic device 400 of FIG. 4. In addition, an operation described in FIG. 6 as being executed by the electronic device 100 may be understood as being performed by the processor 180 of the electronic device 100.

According to various embodiments of the present disclosure, referring to FIG. 6, in operation 610, the electronic device may verify a network accessible or connected by the electronic device. Also, the electronic device may register with the network.

In operation 620, the electronic device may determine whether the second frequency band is included in a signal received by an antenna element. For example, the electronic device may recognize a frequency band of the received signal. The electronic device may determine whether a signal in a specified frequency band (e.g., an MB1) is included in the received signal.

In the case where the second frequency band is included, in operation 630, the electronic device may electrically connect a signal distributor and a second RF block. For example, the electronic device may control a switch such that the signal in the second frequency band is transmitted to the second RF block through the signal distributor.

In the case where the second frequency band is not included, in operation 640, the electronic device may electrically connect the signal distributor and a matching circuit. For example, the electronic device may control a switch such that insertion loss due to impedance mismatching of at least one filter included in the signal distributor decreases by the matching circuit.

In operation 650, the electronic device may maintain a connection state of the network. For example, the electronic device may process the signal in the second frequency band by using the second RF block (or an MB1 RF block) and may process a signal in any other frequency band by using a first RF block (or an LB RF block, an MB2 RF block, and/or an HB RF block).

Figure 7:
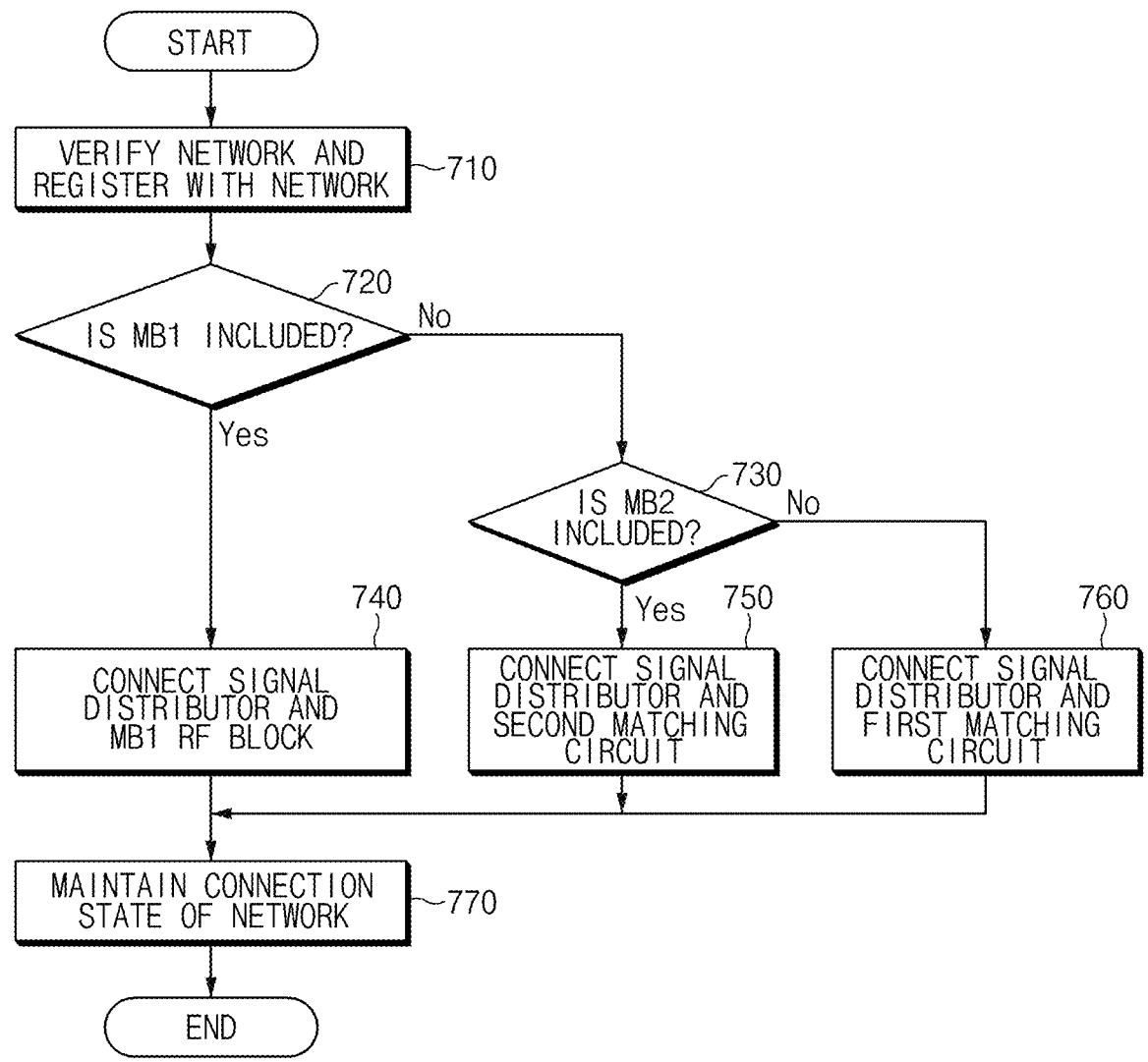
FIG. 7 is a flowchart for describing a method for controlling an antenna included in an electronic device according to an embodiment.

FIG. 7 is a flowchart for describing a method for controlling an antenna included in an electronic device according to an embodiment. For convenience of description, the description given with reference to FIG. 6 will not be repeated here.

Below, it is assumed that the electronic device 300 of FIG. 3 performs a process of FIG. 7. However, it is obvious to those skilled in the art that the same description is applied to the electronic device 100 of FIG. 1, the electronic device 200 of FIG. 2, and the electronic device 400 of FIG. 4. In addition, an operation described in FIG. 7 as being executed by the electronic device 300 may be understood as being performed by the processor 380 of the electronic device 300.

According to various embodiments of the present disclosure, referring to FIG. 7, in operation 710, the electronic device may verify a network accessible or connected by the electronic device. Also, the electronic device may register with the network.

In operation 720, the electronic device may determine whether an MB1 is included in a signal received by an antenna element.

In the case where the MB1 is not included, in operation 730, the electronic device may determine whether an MB2 is included in the signal received by the antenna element. For example, the electronic device may recognize a frequency band of the received signal. The electronic device may determine whether a signal in a specified frequency band (e.g., MB2) is included in the received signal. The description is given in FIG. 7 as the specified frequency band is the MB2, but the present disclosure is not limited thereto. For example, the specified frequency band may be one of various frequency bands such as an LB and/or an HB.

In the case where the MB1 is included, in operation 740, the electronic device may electrically connect a signal distributor and an MB1 RF block.

In the case where the MB1 is not included and the MB2 is included, in operation 750, the electronic device may electrically connect the signal distributor and a second matching circuit. For example, the electronic device may control a switch such that insertion loss of a filter connected with an MB2 RF block decreases.

In the case where the MB1 and the MB2 are not included, in operation 760, the electronic device may electrically connect the signal distributor and a first matching circuit. For example, the electronic device may control a switch such that insertion loss of a filter connected with an LB RF block (or an HB RF block) decreases by the first matching circuit.

In operation 770, the electronic device may maintain a connection state of the network.

Figure 8:
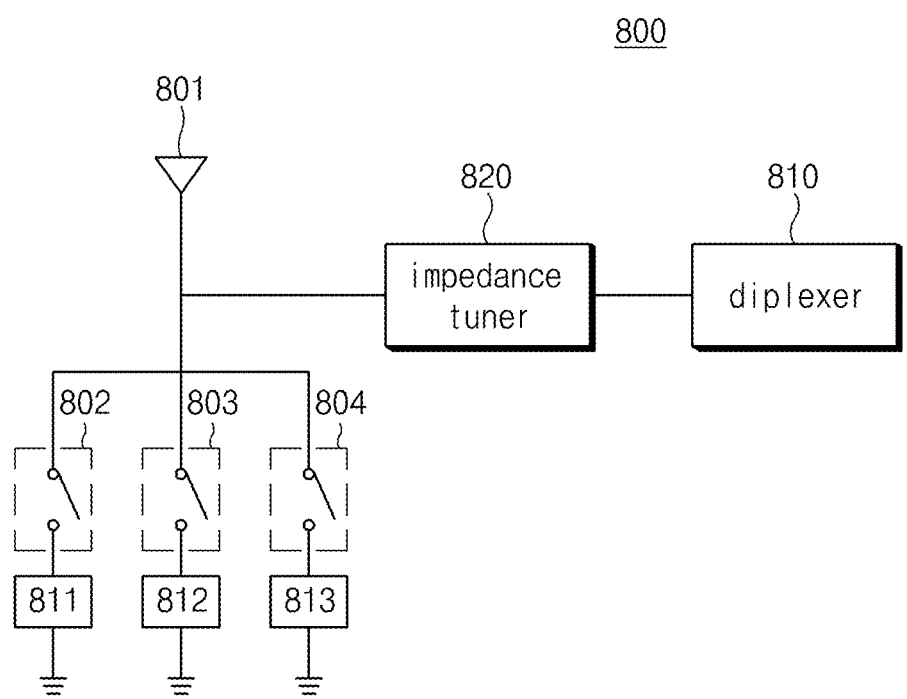
FIGS. 8, 9, and 10 illustrate examples of an antenna structure according to various embodiments.
Figure 9:
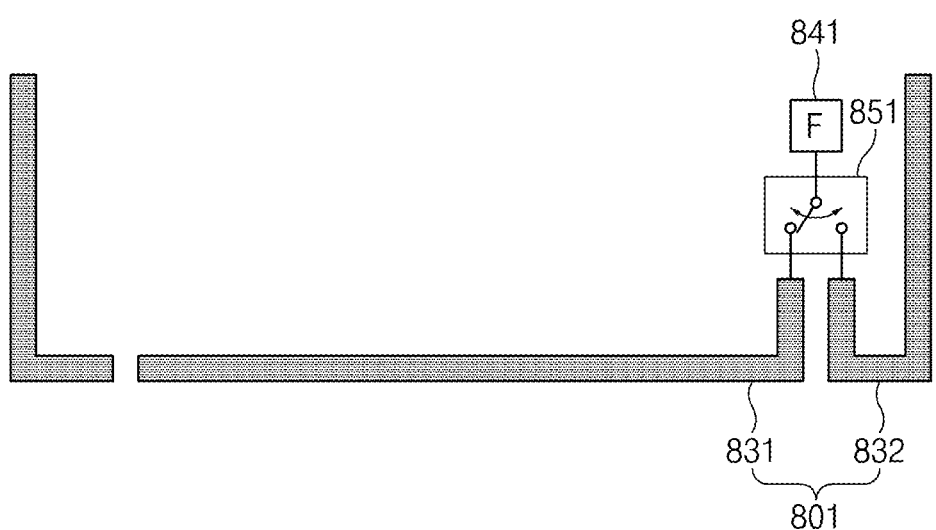
Figure 10:
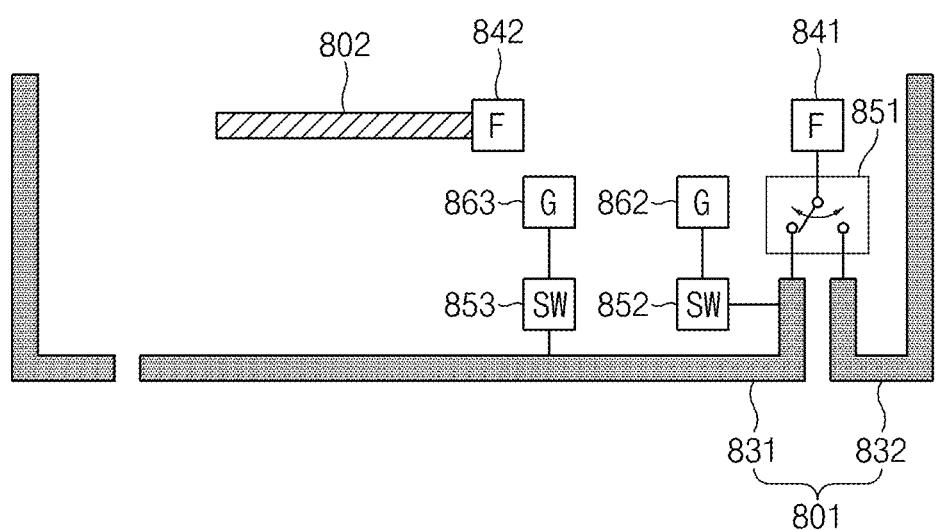

FIGS. 8, 9, and 10 illustrate examples of an antenna structure according to embodiments.

Herein, the antenna structure shown in FIGS. 8, 9, and 10 may be an example, and a variety of examples which may be modified by those skilled in the art may exist.

According to various embodiments of the present disclosure, referring to FIG. 8, a ground location of a first antenna element 801 may be changed in various manners. For example, the first antenna element 801 may be connected with a ground at a first location through a switch 801 and a matching circuit 811, The first antenna element 801 may be connected with the ground at a second location through a switch 802 and a matching circuit 812 or may be connected with the ground at a third location through a switch 803 and a matching circuit 813. A CP (e.g., the processor 180 of FIG. 1) may control the switches 801, 802, and 803 depending on a frequency band of a signal to be received such that a ground location of the first antenna element 801 is changed. In another example, a ground location may be implemented with two ground locations or four or more ground locations.

According to various embodiments, an impedance tuner 820 may be interposed between the first antenna element 801 and a diplexer 810. The impedance tuner 820 may include at least one (variable) lumped element, and an electronic device 800 may control a signal, which is received through the first antenna element 801, by adjusting a value of the lumped element.

According to various embodiments of the present disclosure, referring to FIG. 9, the first antenna element 801 may include a first radiator 831 and a second radiator 832. The first radiator 831 and the second radiator 832 may include at least a portion of a housing (e.g., a metal housing) of the electronic device 800. For example, a side surface of the electronic device 100 may be implemented with a metal housing (or a bezel). The metal housing may be segmented by an insulating material at at least one point. For example, an insulating material or a dielectric may be positioned in a separated space between the first radiator 831 and the second radiator 832. The first radiator 831 and the second radiator 832 may be included in a side housing at a lower end of the electronic device 800. A side housing of a symmetric structure may be provided at an upper end of the electronic device 800. An example of the above structure will be described with reference to FIG. 11.

According to various embodiments, the first radiator 831 and the second radiator 832 may have different electrical lengths. For example, as illustrated, the first radiator 831 may be longer in length than the second radiator 832.

According to various embodiments, a switch 851 may be provided between a feeding part 841 and the first radiator 831 and the second radiator 832. When the feeding part 841 is connected with the first radiator 831 through the switch 851, the electronic device 800 may receive a signal in a frequency band corresponding to an electrical length of the first radiator 831. In this case, the second radiator 832 may be electrically coupled with the first radiator 831, and a signal in a frequency band corresponding to an electrical length including the first radiator 831 and the second radiator 832 may be received. For example, this signal may correspond to a signal in a frequency band which is relatively lower than a frequency band corresponding to an electrical length of the first radiator 831. For example, in the case where the first radiator 831 is fed, a signal in a low frequency band (or a first frequency band) and a mid-frequency band (e.g., a second frequency band) may be received.

According to various embodiments, when the feeding part 841 is connected with the second radiator 832 through the switch 851, the electronic device 800 may receive a signal in a frequency band corresponding to an electrical length of the second radiator 832. For example, this signal may correspond to a signal in a higher frequency band than a frequency band corresponding to an electrical length of the first radiator 831. For example, the first radiator 831 may be electrically coupled with the second radiator 832, and a signal in a frequency band corresponding to an electrical length including the first radiator 831 and the second radiator 832 may be received. For example, in the case where the first radiator 831 is fed, a signal in the low frequency band (or the first frequency band) and the mid-frequency band (e.g., the second frequency band) may be received.

According to various embodiments, the first radiator 831 and the second radiator 832 may be extended from one point to an inner side of the electronic device 800. Portions extended from the respective radiators to the inner side may be positioned adjacent to each other for the purpose of providing an area for capacitive coupling feed. Feeding may be performed through the switch 851 from one end of the portion extended from each radiator to the inner side.

According to various embodiments, the CP may control the switch 851 depending on a frequency used for communication. For example, the CP may control the switch 851 such that the electronic device 800 receives all of frequency signals of a plurality of carriers (e.g., a primary component carrier (PCC) and a secondary component carrier (SCC)) in a CA operation, and thus, the first radiator 831 or the second radiator 832 may be fed.

FIG. 10 illustrates an example in which a second antenna element 802 is added to an antenna structure of FIG. 9.

According to various embodiments of the present disclosure, referring to FIG. 10, the electronic device 800 may feed to the first radiator 831 of the first antenna element 801 and may receive a signal in the first frequency band (e.g., an LB) and the second frequency band (e.g., an MB). When the electronic device 800 intends to perform CA on Band 1 (2110 to 2170 MHz, FDD) which belongs to the MB and band 41 (2496 to 2690 MHz, TDD) which belongs to the HB, the performance of transmitting and receiving a signal in the HB, for example, the third frequency band by the first antenna element 801 may decrease. Alternatively, when the electronic device 800 feeds to the second radiator 832, the performance of transmitting and receiving a signal in a second frequency band (e.g., an MB) may decrease. In the case where the first antenna element 801 operates to receive a signal in the LB or MB, the CP 850 may receive a signal corresponding to Band 41 by feeding to the second antenna element 802 through a feeding part 842.

According to various embodiments, the second antenna element 802 may be positioned on a sub printed circuit board (PCB) located at a lower end of the electronic device 800. In this case, a main PCB may be positioned at an upper end of the electronic device 800, and the main PCB and the sub-PCB may be electrically connected with each other. Also, in an embodiment, the second antenna element 802 may be implemented with a flexible PCB (FPCB). The FPCB corresponding to the second antenna element 802 may be positioned on the sub-PCB. Also, in an embodiment, the second antenna element 802 may be implemented on the main PCB. Also, in an embodiment, the second antenna element 802 may correspond to a portion of the metal housing of the electronic device 800.

According to various embodiments, the first antenna element 801 may be connected with a ground at at least one location. For example, the first antenna element 801 may be connected with the ground at a first ground location 862 and/or a second ground location 863. For example, the electronic device 800 may control a switch 852 and a switch 853 such that the first antenna element 801 is connected with the ground.

Figure 11:
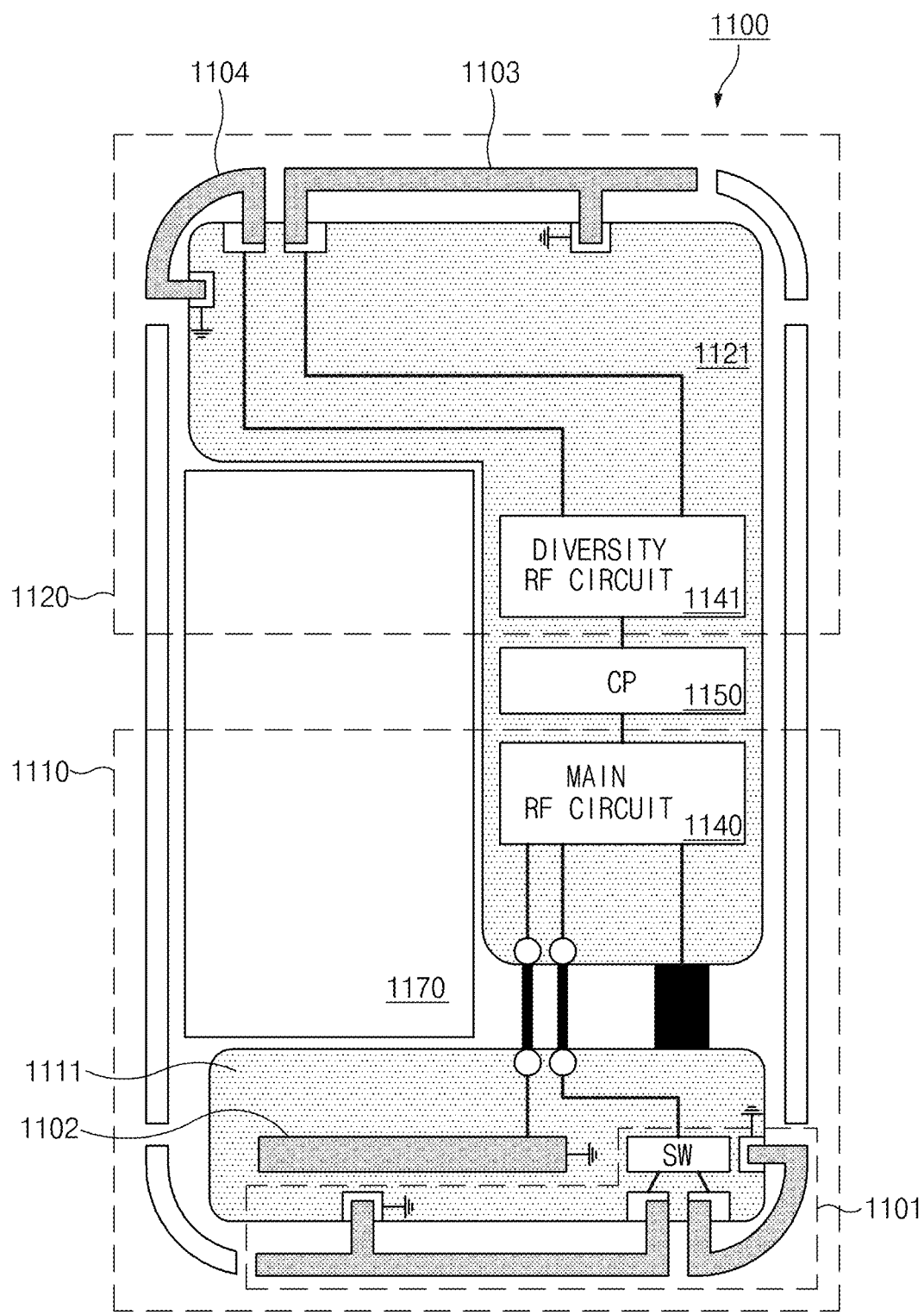
FIG. 11 illustrates hardware components of an electronic device according to an embodiment.

FIG. 11 illustrates hardware components of an electronic device according to an embodiment.

According to various embodiments of the present disclosure, referring to FIG. 11, an electronic device 1100 may include a CP 1150. The CP 1150 may be integrally implemented with any other processing module, for example, at least one processor such as an application processor (AP). For example, the CP 1150 may be implemented in a system on chip (SoC).

According to various embodiments, the CP 1150 may be electrically connected with an RF circuit, for example, a radio frequency integrated chip (RFIC) and may control an operation of the RF circuit. The RF circuit may correspond to a transceiver (e.g., the transceiver 170 of FIG. 1, the transceiver 270 of FIG. 2, the transceiver 370 of FIG. 3, or the transceiver 540 of FIGS. 5A and 5B). Alternatively, the RF circuit may include various hardware components, which perform signal processing on a signal being received or transmitted through an antenna (an antenna radiator), such as an amplifier (e.g., a PA or an LNA), a filter, or a switch, in addition to the transceiver.

According to various embodiments, the RF circuit may include a main RF circuit 1140 and a diversity RF circuit 1141. However, in another embodiment, the electronic device 1100 may include three or more RF circuits or may include one integrated RF circuit.

According to various embodiments, the main RF circuit 1140 may be connected with antenna elements positioned on a lower portion 1110 of the electronic device 1100. For example, the main RF circuit 1140 may be electrically connected with a first antenna element 1101 and a second antenna element 1102. According to an embodiment, the first antenna element 1101 and the second antenna element 1102 may have an electrical length for receiving at least one frequency band. For example, the first antenna element 1101 may receive a signal in the first frequency band and the second frequency band, and the second antenna element 1102 may receive a signal in the third frequency band. In an embodiment, the first antenna element 1101 and the second antenna element 1102 may receive a signal in a specific frequency band in common. According to an embodiment, the electronic device 1100 may perform MB-HB CA by using a component carrier (CC) of an MB received through the first antenna element 1101 and a CC of an HB received through the second antenna element 1102. According to an embodiment, in the case where a frequency range of the HB received through the second antenna element 1102 overlaps a frequency range of the HB receivable through the first antenna element 1101, the electronic device 1100 may implement a second-order diversity function by using a signal received in common through the first antenna element 1101 and the second antenna element 1102.

According to various embodiments, the electronic device 1100 may also use a signal received through a third antenna element 1103 and a fourth antenna element 1104 positioned on an upper portion 1120 of the electronic device 1100 for diversity. In the case where the first to fourth antenna elements 1101, 1102, 1103, and 1104 may receive a signal in a specific frequency range in common, the electronic device 1100 may implement a fourth-order diversity function.

According to various embodiments, the electronic device 1100 may have various antenna structures in addition to the example illustrated in FIG. 11. The electronic device 1100 may include a plurality of antennas for implementing various embodiments of the present disclosure, and may not be limited to a device which has two antennas on an upper portion and a lower portion. For example, in FIG. 11, even though the antenna elements 1101 and 1102 positioned on the lower portion and the antenna elements 1103 and 1104 positioned on the upper portion have a symmetric structure, a structure or location of each of some antenna elements may be appropriately modified in consideration of any other electronic parts and a design of the electronic device 1100 depending on a frequency band to be received and a CA or diversity function to be implemented. In addition, an antenna structure variously changeable by those skilled in the art may be considered.

According to various embodiments, the first antenna element 1101 and the second antenna element 1102 may include a portion of a metal frame forming a housing of the electronic device 1100. The first antenna element 1101 and the second antenna element 1102 may be extended to the inside of the electronic device 1100. For example, the first antenna element 1101 and the second antenna element 1102 may include a feeding piece and a ground piece extended to the inside of the electronic device 1100. The first antenna element 1101 and the second antenna element may be fed through the feeding piece and may be grounded through the ground piece. When a first PCB 1111 is mounted on an electronic device, the feeding piece and the ground piece may be electrically connected with a feeding part and a ground part, respectively, or may be electrically connected with the feeding part and the ground part through a separate connection member (e.g., a C-clip). The feeding piece may be electrically connected through an electrical path with a feeding pad formed on the first PCB 111, and the ground piece may be electrically connected through any other electrical path with a ground pad formed on the first PCB 111. For example, the first antenna element 1101 and the second antenna element 1102 may be positioned at a lower end of the electronic device 1100, and the third antenna element 1103 and the fourth antenna element 1104 may be positioned at an upper end of the electronic device 1100. The first antenna element 1101 and the third antenna element 1103 may be separated from the second antenna element 1103 and the fourth antenna element 1104 by a segment part. The segment part may be formed of a dielectric. The segment part may be formed at the metal bezel through double-shot injection or insert molding of a material such as synthetic resin. However, the present disclosure is not limited thereto, and the segment part may be formed of various materials having an insulating property.

According to various embodiments, the main RF circuit 1140 may be connected with the first antenna element 1101 and the second antenna element 1102 through a switch. The diversity RF circuit 1141 may be electrically connected with a sub-antenna for receiving a diversity signal of a main antenna and may process the diversity signal received from the sub-antenna. For example, the diversity RF circuit 1141 may be electrically connected with the third antenna element 1103 and the fourth antenna element 1104. In the case where the first antenna element 1101 receives a signal in the first frequency band and the third antenna element 1103 is a sub-antenna of the first antenna element 1101, the third antenna element 1103 may also receive a (diversity) signal in the first frequency band. According to an embodiment, when a 4Rx diversity operation in which four antennas receive a signal in the same frequency band is performed, in the case where the first antenna element 1101 is a main antenna which receives a signal in the first frequency band, the second antenna element 1102, the third antenna element 1103, and the fourth antenna element 1104 may receive a diversity signal in the first frequency band.

According to various embodiments, the electronic device 1100 may include the first PCB 1111 and a second PCB 1121. Various circuits and elements for processing a signal received from an antenna may be positioned on the first PCB 1111 or the second PCB 1121. In an example illustrated, the second antenna element 1102 illustrated as being positioned on the first PCB 1111, but, in another embodiment, the second antenna element 1102 may be positioned on a third PCB lower or higher in height than the first PCB 1111, or an FPCB. Also, the first PCB 1111 and the second PCB 1121 may be electrically connected. The first PCB 1111 and the second PCB 1121 may be electrically connected by coaxial lines. The electronic device 1100 may include a battery 1170 for the purpose of supplying a power to parts positioned on a PCB and feeding to an antenna radiator.

Figure 12:
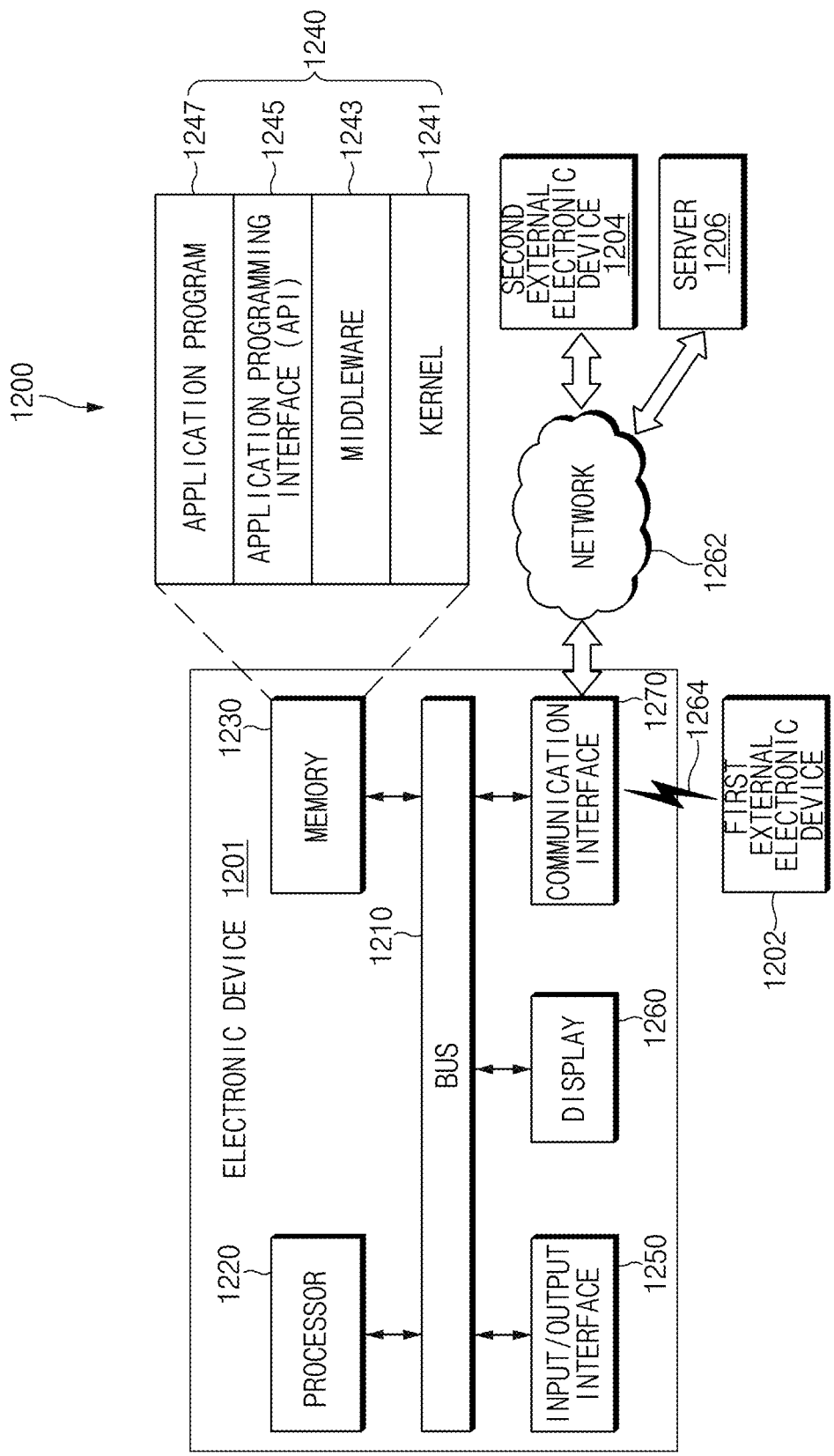
FIG. 12 illustrates an electronic device in a network environment according to an embodiment.

Referring to FIG. 12, according to various embodiments, an electronic device 1201 in a network environment is described. The electronic device 1201 may include a bus 1210, a processor 1220, a memory 1230, an input/output interface 1250, a display 1260, and a communication interface 1270. According to an embodiment, the electronic device 1201 may not include at least one of the above-described elements or may further include other element(s). The bus 1210 may interconnect the above-described elements 1210 to 1270 and may include a circuit for conveying communications (e.g., a control message and/or data) among the above-described elements. The processor 1220 may include one or more of a central processing unit (CPU), an application processor (AP), or a communication processor (CP). For example, the processor 1220 may perform an arithmetic operation or data processing associated with control and/or communication of at least other elements of the electronic device 1201.

The memory 1230 may include a volatile and/or nonvolatile memory.

For example, the memory 1230 may store instructions or data associated with at least one other element(s) of the electronic device 1201. According to an embodiment, the memory 1230 may store software and/or a program 1240. The program 1240 may include, for example, a kernel 1241, a middleware 1243, an application programming interface (API) 1245, and/or an application program (or "an application") 1247. At least a part of the kernel 1241, the middleware 1243, or the API 1245 may be referred to as an "operating system (OS)". For example, the kernel 1241 may control or manage system resources (e.g., the bus 1210, the processor 1220, the memory 1230, and the like) that are used to execute operations or functions of other programs (e.g., the middleware 1243, the API 1245, and the application program 1247). Furthermore, the kernel 1241 may provide an interface that allows the middleware 1243, the API 1245, or the application program 1247 to access discrete elements of the electronic device 1201 so as to control or manage system resources.

The middleware 1243 may perform, for example, a mediation role such that the API 1245 or the application program 1247 communicates with the kernel 1241 to exchange data. Furthermore, the middleware 1243 may process one or more task requests received from the application program 1247 according to a priority. For example, the middleware 1243 may assign the priority, which makes it possible to use a system resource (e.g., the bus 1210, the processor 1220, the memory 1230, or the like) of the electronic device 1201, to at least one of the application program 1247 and may process the one or more task requests. The API 1245 may be an interface through which the application program 1247 controls a function provided by the kernel 1241 or the middleware 1243, and may include, for example, at least one interface or function (e.g., an instruction) for a file control, a window control, image processing, a character control, or the like. The input/output interface 1250 may transmit an instruction or data input from a user or another external device, to other element(s) of the electronic device 1201 or may output an instruction or data, received from other element(s) of the electronic device 1201, to a user or another external device.

The display 1260 may include, for example, a liquid crystal display (LCD), a light-emitting diode (LED) display, an organic LED (OLED) display, a microelectromechanical systems (MEMS) display, or an electronic paper display. The display 1260 may display, for example, various contents (e.g., a text, an image, a video, an icon, a symbol, and the like) to a user. The display 1260 may include a touch screen and may receive, for example, a touch, gesture, proximity, or hovering input using an electronic pen or a part of a user's body. For example, the communication interface 1270 may establish communication between the electronic device 1201 and an external device (e.g., the first electronic device 1202, the second electronic device 1204, or the server 1206). For example, the communication interface 1270 may be connected to the network 1262 over wireless communication or wired communication to communicate with the external device (e.g., the second electronic device 1204 or the server 1206).

For example, the wireless communication may include cellular communication using at least one of long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like. The wireless communication may include at least one of wireless fidelity (Wi-Fi), Bluetooth, Bluetooth low energy (BLE), Zigbee, near field communication (NFC), magnetic stripe transmission (MST), radio frequency (RF), a body area network, or the like. According to an embodiment, the wireless communication may include GNSS. The GNSS may be one of, for example, a global positioning system (GPS), a global navigation satellite system (Glonass), a Beidou navigation satellite system (hereinafter referred to as "Beidou"), or an European global satellite-based navigation system (hereinafter referred to as "Galileo"). Hereinafter, in this disclosure, "GPS" and "GNSS" may be interchangeably used. The wired communication may include at least one of, for example, a universal serial bus (USB), a high definition multimedia interface (HDMI), a recommended standard-1332 (RS-1332), powerline communication, a plain old telephone service (POTS), or the like. The network 1262 may include at least one of telecommunications networks, for example, a computer network (e.g., LAN or WAN), an Internet, or a telephone network.

Each of the first and second external electronic devices 1202 and 1204 may be a device of which the type is different from or the same as that of the electronic device 1201. According to various embodiments, all or a portion of operations that the electronic device 1201 will perform may be executed by another or plural electronic devices (e.g., the electronic device 1202 or 1204 or the server 1206). According to an embodiment, in the case where the electronic device 1201 executes any function or service automatically or in response to a request, the electronic device 1201 may not perform the function or the service internally, but, alternatively additionally, it may request at least a portion of a function associated with the electronic device 1201 at other electronic device (e.g., the electronic device 1202 or 1204 or the server 1206). The other electronic device (e.g., the electronic device 1202 or 1204 or the server 1206) may execute the requested function or additional function and may transmit the execution result to the electronic device 1201. The electronic device 1201 may provide the requested function or service using the received result or may additionally process the received result to provide the requested function or service. To this end, for example, cloud computing, distributed computing, or client-server computing may be used.

Figure 13:
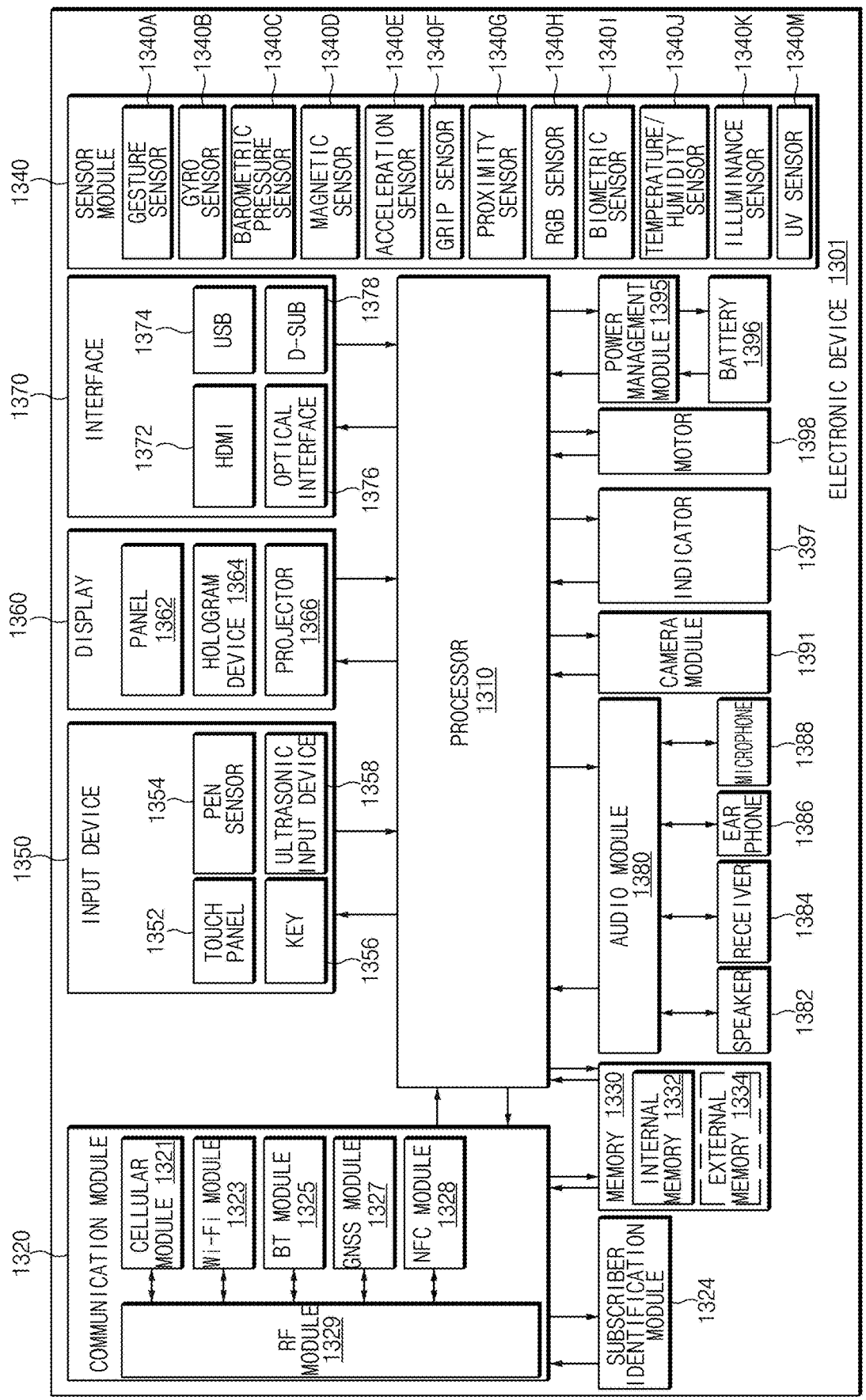
FIG. 13 illustrates a block diagram of an electronic device according to an embodiment.

FIG. 13 illustrates a block diagram of an electronic device, according to various embodiments. An electronic device 1301 may include, for example, all or a part of the electronic device 1201 illustrated in FIG. 12. The electronic device 1301 may include one or more processors (e.g., an application processor (AP)) 1310, a communication module 1320, a subscriber identification module 1324, a memory 1330, a sensor module 1340, an input device 1350, a display 1360, an interface 1370, an audio module 1380, a camera module 1391, a power management module 1395, a battery 1396, an indicator 1397, and a motor 1398. For example, the processor 1310 may be implemented with a System on Chip (SoC). According to an embodiment, the processor 1310 may further include a graphic processing unit (GPU) and/or an image signal processor. The processor 1310 may include at least a part (e.g., a cellular module 1321) of elements illustrated in FIG. 13. The processor 1310 may load a command or data, which is received from at least one of other elements (e.g., a nonvolatile memory), into a volatile memory and process the loaded instruction or data. The processor 1310 may store result data in the nonvolatile memory.

The communication module 1320 may be configured the same as or similar to the communication interface 1270 of FIG. 12. The communication module 1320 may include the cellular module 1321, a Wi-Fi module 1323, a Bluetooth (BT) module 1325, a GNSS module 1327, a near field communication (NFC) module 1328, and a radio frequency (RF) module 1329. The cellular module 1321 may provide, for example, voice communication, video communication, a character service, an Internet service, or the like over a communication network. According to an embodiment, the cellular module 1321 may perform discrimination and authentication of the electronic device 1301 within a communication network by using the subscriber identification module (e.g., a SIM card) 1324. According to an embodiment, the cellular module 1321 may perform at least a portion of functions that the processor 1310 provides. According to an embodiment, the cellular module 1321 may include a communication processor (CP). According to an embodiment, at least a part (e.g., two or more) of the cellular module 1321, the Wi-Fi module 1323, the BT module 1325, the GNSS module 1327, or the NFC module 1328 may be included within one Integrated Circuit (IC) or an IC package. For example, the RF module 1329 may transmit and receive a communication signal (e.g., an RF signal). For example, the RF module 1329 may include a transceiver, a power amplifier module (PAM), a frequency filter, a low noise amplifier (LNA), an antenna, or the like. According to another embodiment, at least one of the cellular module 1321, the Wi-Fi module 1323, the BT module 1325, the GNSS module 1327, or the NFC module 1328 may transmit and receive an RF signal through a separate RF module. The subscriber identification module 1324 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 1330 (e.g., the memory 1230) may include an internal memory 1332 or an external memory 1334. For example, the internal memory 1332 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD). The external memory 1334 may include a flash drive such as compact flash (CF), secure digital (SD), micro secure digital (Micro-SD), mini secure digital (Mini-SD), extreme digital (xD), a multimedia card (MMC), a memory stick, or the like. The external memory 1334 may be operatively and/or physically connected to the electronic device 1301 through various interfaces.

The sensor module 1340 may measure, for example, a physical quantity or may detect an operation state of the electronic device 1301. The sensor module 1340 may convert the measured or detected information to an electric signal. For example, the sensor module 1340 may include at least one of a gesture sensor 1340A, a gyro sensor 1340B, a barometric pressure sensor 1340C, a magnetic sensor 1340D, an acceleration sensor 1340E, a grip sensor 1340F, the proximity sensor 1340G, a color sensor 1340H (e.g., red, green, blue (RGB) sensor), a biometric sensor 1340I, a temperature/humidity sensor 1340J, an illuminance sensor 1340K, or an UV sensor 1340M. Although not illustrated, additionally or alternatively, the sensor module 1340 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1340 may further include a control circuit for controlling at least one or more sensors included therein. According to an embodiment, the electronic device 1301 may further include a processor that is a part of the processor 1310 or independent of the processor 1310 and is configured to control the sensor module 1340. The processor may control the sensor module 1340 while the processor 1310 remains at a sleep state.

The input device 1350 may include, for example, a touch panel 1352, a (digital) pen sensor 1354, a key 1356, or an ultrasonic input unit 1358. For example, the touch panel 1352 may use at least one of capacitive, resistive, infrared and ultrasonic detecting methods. Also, the touch panel 1352 may further include a control circuit. The touch panel 1352 may further include a tactile layer to provide a tactile reaction to a user. The (digital) pen sensor 1354 may be, for example, a part of a touch panel or may include an additional sheet for recognition. The key 1356 may include, for example, a physical button, an optical key, or a keypad. The ultrasonic input device 1358 may detect (or sense) an ultrasonic signal, which is generated from an input device, through a microphone (e.g., a microphone 1388) and may check data corresponding to the detected ultrasonic signal.

The display 1360 (e.g., the display 1260) may include a panel 1362, a hologram device 1364, a projector 1366, and/or a control circuit for controlling the panel 1362, the hologram device 1364, or the projector 1366. The panel 1362 may be implemented, for example, to be flexible, transparent or wearable. The panel 1362 and the touch panel 1352 may be integrated into a single module. According to an embodiment, the panel 1362 may include a pressure sensor (or force sensor) that measures the intensity of touch pressure by a user. The pressure sensor may be implemented integrally with the touch panel 1352, or may be implemented as at least one sensor separately from the touch panel 1352. The hologram device 1364 may display a stereoscopic image in a space using a light interference phenomenon. The projector 1366 may project light onto a screen so as to display an image. For example, the screen may be arranged in the inside or the outside of the electronic device 1301. The interface 1370 may include, for example, a high-definition multimedia interface (HDMI) 1372, a universal serial bus (USB) 1374, an optical interface 1376, or a D-subminiature (D-sub) 1378. The interface 1370 may be included, for example, in the communication interface 1270 illustrated in FIG. 12. Additionally or alternatively, the interface 1370 may include, for example, a mobile high definition link (MHL) interface, a SD card/multimedia card (MMC) interface, or an infrared data association (IrDA) standard interface.

The audio module 1380 may convert a sound and an electric signal in dual directions. At least a part of the audio module 1380 may be included, for example, in the input/output interface 1250 illustrated in FIG. 12. The audio module 1380 may process, for example, sound information that is input or output through a speaker 1382, a receiver 1384, an earphone 1386, or the microphone 1388. For example, the camera module 1391 may shoot a still image or a video. According to an embodiment, the camera module 1391 may include at least one or more image sensors (e.g., a front sensor or a rear sensor), a lens, an image signal processor (ISP), or a flash (e.g., an LED or a xenon lamp). The power management module 1395 may manage, for example, power of the electronic device 1301. According to an embodiment, a power management integrated circuit (PMIC), a charger IC, or a battery or fuel gauge may be included in the power management module 1395. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 1396 and a voltage, current or temperature thereof while the battery is charged. The battery 1396 may include, for example, a rechargeable battery and/or a solar battery.

The indicator 1397 may display a specific state of the electronic device 1301 or a part thereof (e.g., the processor 1310), such as a booting state, a message state, a charging state, and the like. The motor 1398 may convert an electrical signal into a mechanical vibration and may generate the following effects: vibration, haptic, and the like. The electronic device 1301 may include a processing device (e.g., a GPU) for supporting a mobile TV. The processing device for supporting the mobile TV may process media data according to the standards of digital multimedia broadcasting (DMB), digital video broadcasting (DVB), MediaFLO™, or the like. Each of the above-mentioned elements of the electronic device according to various embodiments of the present disclosure may be configured with one or more components, and the names of the elements may be changed according to the type of the electronic device. In various embodiments, some elements of the electronic device (e.g., the electronic device 1301) may be omitted or other additional elements may be added. Furthermore, some of the elements of the electronic device may be combined with each other so as to form one entity, so that the functions of the elements may be performed in the same manner as before the combination.

Figure 14:
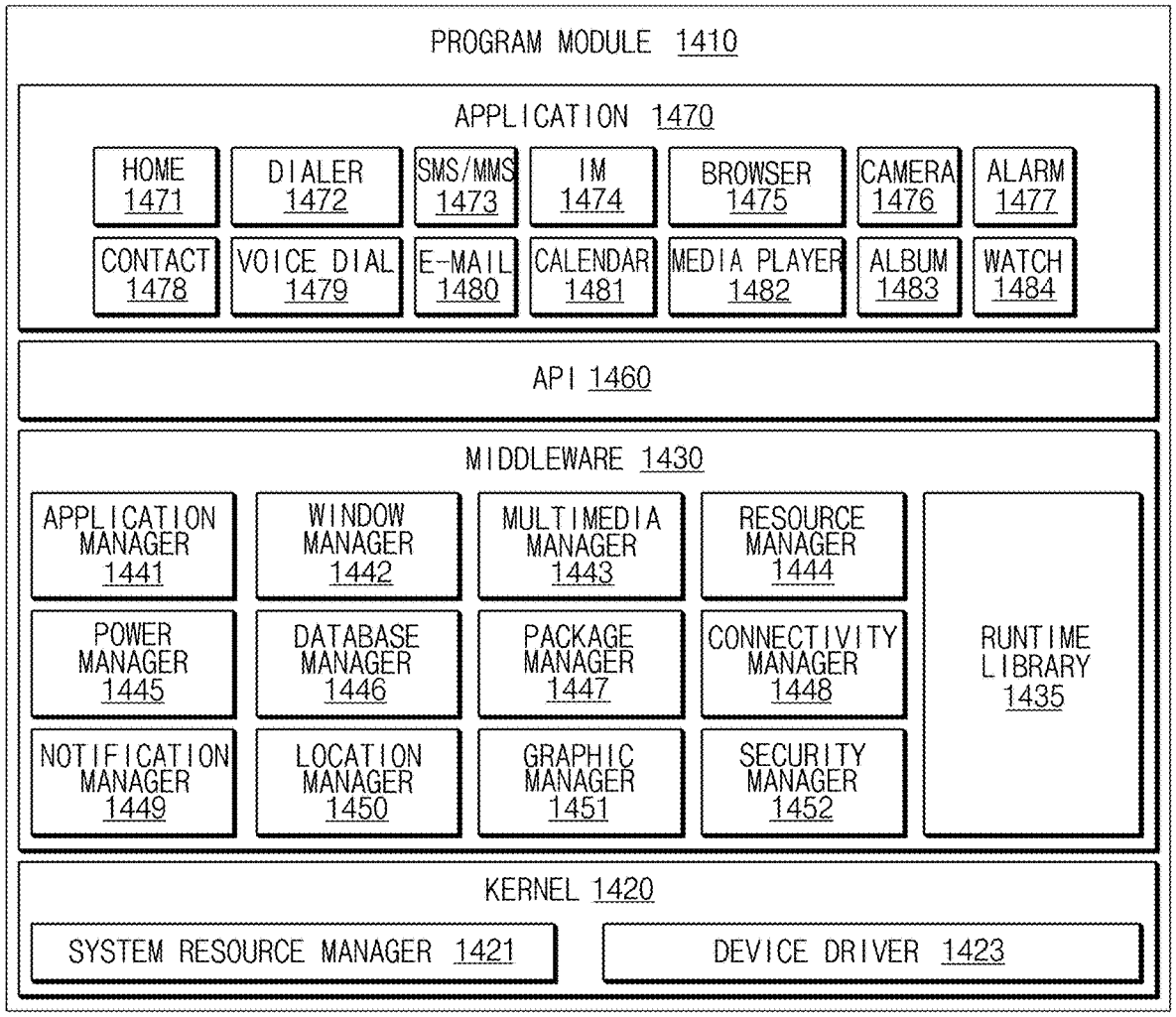
FIG. 14 is a block diagram of a program module according to an embodiment.

FIG. 14 illustrates a block diagram of a program module, according to various embodiments. According to an embodiment, a program module 1410 (e.g., the program 1240) may include an operating system (OS) to control resources associated with an electronic device (e.g., the electronic device 1201), and/or diverse applications (e.g., the application program 1247) driven on the OS. The OS may be, for example, Android™, iOS™, Windows™ Symbian™, Tizen™, or Bada™. The program module 1410 may include a kernel 1420 (e.g., the kernel 1241), a middleware 1430 (e.g., the middleware 1243), an application programming interface (API) 1460 (e.g., the API 1245), and/or an application 1470 (e.g., the application program 1247). At least a portion of the program module 1410 may be preloaded on an electronic device or may be downloadable from an external electronic device (e.g., the first electronic device 1202, the second electronic device 1204, the server 1206, or the like).

The kernel 1420 (e.g., the kernel 1241) may include, for example, a system resource manager 1421 or a device driver 1423. The system resource manager 1421 may control, allocate, or retrieve system resources. According to an embodiment, the system resource manager 1421 may include a process managing unit, a memory managing unit, a file system managing unit, or the like. The device driver 1423 may include, for example, a display driver, a camera driver, a Bluetooth driver, a shared memory driver, a USB driver, a keypad driver, a Wi-Fi driver, an audio driver, or an inter-process communication (IPC) driver. The middleware 1430 may provide, for example, a function that the application 1470 needs in common, or may provide diverse functions to the application 1470 through the API 1460 to allow the application 1470 to efficiently use limited system resources of the electronic device. According to an embodiment, the middleware 1430 may include at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, or a security manager 1452.

The runtime library 1435 may include, for example, a library module that is used by a compiler to add a new function through a programming language while the application 1470 is being executed. The runtime library 1435 may perform input/output management, memory management, or capacities about arithmetic functions. The application manager 1441 may manage, for example, a life cycle of at least one application of the application 1470. The window manager 1442 may manage a graphic user interface (GUI) resource that is used in a screen. The multimedia manager 1443 may identify a format necessary for playing diverse media files, and may perform encoding or decoding of media files by using a codec suitable for the format. The resource manager 1444 may manage resources such as a memory space or source code of the application 1470. The power manager 1445 may manage a battery or power, and may provide power information for an operation of an electronic device. According to an embodiment, the power manager 1445 may operate with a basic input/output system (BIOS). The database manager 1446 may generate, search for, or modify database that is to be used in the application 1470. The package manager 1447 may install or update an application that is distributed in the form of package file.

The connectivity manager 1448 may manage, for example, wireless connection. The notification manager 1449 may provide an event, for example, arrival message, appointment, or proximity notification to a user. For example, the location manager 1450 may manage location information about an electronic device. The graphic manager 1451 may manage a graphic effect that is provided to a user, or manage a user interface relevant thereto. The security manager 1452 may provide, for example, system security or user authentication. According to an embodiment, the middleware 1430 may include a telephony manager for managing a voice or video call function of the electronic device or a middleware module that combines diverse functions of the above-described elements. According to an embodiment, the middleware 1430 may provide a module specialized to each OS kind to provide differentiated functions. Additionally, the middleware 1430 may dynamically remove a part of the preexisting elements or may add new elements thereto. The API 1460 may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 1470 may include, for example, applications such as a home 1471, a dialer 1472, an SMS/MMS 1473, an instant message (IM) 1474, a browser 1475, a camera 1476, an alarm 1477, a contact 1478, a voice dial 1479, an e-mail 1480, a calendar 1481, a media player 1482, an album 1483, a watch 1484, health care (e.g., measuring an exercise quantity, blood sugar, or the like) or offering of environment information (e.g., information of barometric pressure, humidity, temperature, or the like). According to an embodiment, the application 1470 may include an information exchanging application to support information exchange between an electronic device and an external electronic device. The information exchanging application may include, for example, a notification relay application for transmitting specific information to an external electronic device, or a device management application for managing the external electronic device. For example, the notification relay application may include a function of transmitting notification information, which arise from other applications, to an external electronic device or may receive, for example, notification information from an external electronic device and provide the notification information to a user. The device management application may install, delete, or update for example, a function (e.g., turn-on/turn-off of an external electronic device itself (or a part of components) or adjustment of brightness (or resolution) of a display) of the external electronic device which communicates with the electronic device, and an application running in the external electronic device. According to an embodiment, the application 1470 may include an application (e.g., a health care application of a mobile medical device) that is assigned in accordance with an attribute of an external electronic device. According to an embodiment, the application 1470 may include an application that is received from an external electronic device. At least a portion of the program module 1410 may be implemented by software, firmware, hardware (e.g., the processor 1310), or a combination (e.g., execution) of two or more thereof, and may include modules, programs, routines, sets of instructions, processes, or the like for performing one or more functions.

The term "module" used in this disclosure may include a unit composed of hardware, software and firmware and may be interchangeably used with the terms "unit", "logic", "logical block", "component" and "circuit". The "module" may be an integrated component or may be a minimum unit for performing one or more functions or a part thereof. The "module" may be implemented mechanically or electronically and may include at least one of an application-specific IC (ASIC) chip, a field-programmable gate array (FPGA), and a programmable-logic device for performing some operations, which are known or will be developed. At least a part of an apparatus (e.g., modules or functions thereof) or a method (e.g., operations) according to various embodiments may be, for example, implemented by instructions stored in computer-readable storage media (e.g., the memory 1230) in the form of a program module. The instruction, when executed by a processor (e.g., the processor 1220), may cause the processor to perform a function corresponding to the instruction. A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and an internal memory. Also, the one or more instructions may contain a code made by a compiler or a code executable by an interpreter. A module or a program module according to various embodiments may include at least one of the above elements, or a part of the above elements may be omitted, or other elements may be further included. Operations performed by a module, a program module, or other elements according to various embodiments may be executed sequentially, in parallel, repeatedly, or in a heuristic method or some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   an antenna element configured to receive a signal in at least one frequency band of a first frequency band or a second frequency band;
   a transceiver including a first port and a second port;
   a signal distributor electrically connected with the antenna element, and including a first filter corresponding to the first frequency band and a second filter corresponding to the second frequency band, the first filter ebing electrically connected to the first port of the transceiver;
   a matching circuit;
   a switch configured to selectively connect the second filter with the matching circuit or the second port of the transceiver; and
   a processor electrically connected with the transceiver.

2. The electronic device of claim 1, wherein the antenna element includes a first radiator and a second radiator, and
   wherein the first radiator and the second radiator are positioned adjacent to each other such that any one of the first and second radiators is fed by coupling when the other one of the first and second radiator is fed.

3. The electronic device of claim 1, wherein the antenna element is configured to receive a signal in at least one frequency band of the first frequency band, the second frequency band, or a third frequency band, and includes a first radiator and a second radiator,
   wherein the first radiator and the second radiator are positioned adjacent to each other such that any one of the first and second radiators is fed by coupling when the other one of the first and second radiator is fed, and
   wherein the antenna element is configured to:
      receive a signal in the first frequency band and the second frequency band when the first radiator is fed; and
      receive a signal in the first frequency band and the third frequency band when the second radiator is fed.

4. The electronic device of claim 1, wherein the antenna element includes at least a portion of a metal housing of the electronic device.

5. The electronic device of claim 1, wherein the signal distributor includes a multiplexer.

6. The electronic device of claim 1, wherein the signal distributor comprises a diplexer including the first filter and the second filter.

7. The electronic device of claim 1, wherein the processor is configured to:
   based on the antenna element receiving a signal in a frequency band other than the second frequency band, control the switch to electrically connect the second filter with the matching circuit; and
   based on the antenna element receiving a signal in at least the secondary frequency band, control the switch electrically connect the second filter with the second port of the transceiver.

8. The electronic device of claim 1, wherein the antenna element is configured to receive a signal in at least one frequency band of the first frequency band, the second frequency band, or a third frequency band, and
   wherein the signal distributor comprises a triplexer including the first filter, the second filter, and a third filter corresponding to the third frequency band.

9. The electronic device of claim 8, wherein the processor is configured to:
   based on the antenna element receiving a signal in the first frequency band, the third frequency band, or the first frequency band and the third frequency band control the switch to electrically connect the second filter with the matching circuit; and
   based on the antenna element receiving a signal in at least the second frequency band, control switch to electrically connect the second filter with the second port of the transceiver.

10. The electronic device of claim 8, wherein the antenna element is a first antenna element, and
    the electronic device further comprises:
    a second antenna element electrically coupled with the transceiver and configured to receive a signal in the third frequency band,
    wherein the processor is configured to:
       based on at least one of the first antenna element or the second antenna element receiving a signal in the first frequency band, the third frequency band, or the first frequency band and the third frequency band, control the switch to electrically connect the second filter with the matching circuit; and
       based on teh first antenna element receiving a signal in at least the second frequency band, control the switch to electrically connect the second filer with the second port of the transceiver.

11. The electronic device of claim 8, wherein the matching circuit is a first matching circuit, and
    the electronic device comprises:
    a second matching circuit electrically connectable with a second filter,
    wherein the switch is configured to selectively connect the second filter with the first matching circuit, the second matching circuit, or the transceiver, and wherein the processor is configured to:
  based on the antenna element receiving a signal in the first frequency band, control the switch to electrically connect the second filter with the first matching circuit; and
  based on the antenna element receiving a signal in the third frequency band, control the switch to electrically connect the second filter with the second matching circuit.

12. The electronic device of claim 8, wherein the matching circuit is a first matching circuit,
  wherein the switch is a first switch,
  the electronic device further comprises:
  a second matching circuit electrically connectable with the first filter; and
  a second switch selectively connecting the first filter with the second matching circuit or the transceiver, and
  wherein the processor is configured to:
    based on the antenna element receiving a signal in the first frequency band, control the first switch to electrically connect the second filter with the first matching circuit;
    based on the antenna element receiving a signal in the second frequency band, control the second switch to electrically connect the first filter with the second matching circuit; and
    based on the antenna element receiving a signal in the third frequency band, control the second switch to electrically connect the first filter with the second matching circuit or control the first switch to electrically connect the second filter with the first matching circuit.

13. The electronic device of claim 8, wherein the matching circuit is a first matching circuit,
  wherein the switch is a first switch,
  the electronic device further comprises:
  a second matching circuit electrically connectable with the third filter; and
  a second switch selectively connecting the third filter with the second matching circuit or the transceiver, and
  wherein the processor is configured to:
    based on the antenna element receiving a signal in the first frequency band, control the first switch to electrically connect the second filter with the first matching circuit or control the second switch to electrically connect the third filter with the second matching circuit;
    based on the antenna element receiving a signal in the second frequency band, control the second switch to electrically connect the third filter with the second matching circuit; and
    based on the antenna element receiving a signal in the third frequency band, control the first switch to electrically connect the second filter with the first matching circuit.

14. The electronic device of claim 1, wherein the processor is configured to:
  determine a frequency band of a signal received by the antenna element.

15. An electronic device comprising:
  an antenna element configured to receive a signal in at least one frequency band of a first frequency band a second frequency band;
  a transceiver including a first port and a second port,
  a signal distributor electrically connected with the antenna element, and including a first filter corresponding to the first frequency band and a second filter corresponding to the second frequency band, the first filter being electrically connected to the first port of the transceiver;
  a switch connected to the second filter, but not the first filter, the switch being configured to selectively connect the second filter with the second port of the transceiver; and
  a processor electrically connected with the transceiver.

\* \* \* \* \*